US011381420B2

(12) United States Patent
Torisaki et al.

(10) Patent No.: US 11,381,420 B2
(45) Date of Patent: Jul. 5, 2022

(54) IN-VEHICLE RELAY DEVICE, IN-VEHICLE MONITORING DEVICE, IN-VEHICLE NETWORK SYSTEM, COMMUNICATION MONITORING METHOD, AND RECORDING MEDIUM

(71) Applicant: Panasonic Intellectual Property Corporation of America, Torrance, CA (US)

(72) Inventors: Yuishi Torisaki, Osaka (JP); Hiroyasu Terazawa, Osaka (JP); Tomoyuki Haga, Nara (JP); Yoshihiro Ujiie, Osaka (JP); Ryo Kato, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 335 days.

(21) Appl. No.: 16/734,435

(22) Filed: Jan. 6, 2020

(65) Prior Publication Data

US 2020/0145252 A1 May 7, 2020

Related U.S. Application Data

(63) Continuation of application No. PCT/JP2018/027011, filed on Jul. 19, 2018, which is
(Continued)

(51) Int. Cl.
*H04W 4/40* (2018.01)
*H04L 12/40* (2006.01)
(Continued)

(52) U.S. Cl.
CPC .. *H04L 12/40013* (2013.01); *H04L 12/40182* (2013.01); *H04L 12/4625* (2013.01);
(Continued)

(58) Field of Classification Search
CPC ......... H04L 12/40013; H04L 12/40182; H04L 12/4625; H04L 12/4633; H04L 69/08; H04W 4/40
See application file for complete search history.

(56) References Cited

U.S. PATENT DOCUMENTS 11,140,632 B2 * 10/2021 Okada ................ B60R 16/03
2011/0235648 A1 * 9/2011 Ando ................ H04J 3/0652
370/401

(Continued)

FOREIGN PATENT DOCUMENTS

CN 104852893 A 8/2015
EP 3113529 A1 1/2017
(Continued)

OTHER PUBLICATIONS

The Extended European Search Report dated Jul. 8, 2020 for European Patent Application No. 18838223.8.
(Continued)

*Primary Examiner* — Henry Tsai
*Assistant Examiner* — Christopher A Daley
(74) *Attorney, Agent, or Firm* — Greenblum & Bernstein, P.L.C.

(57) ABSTRACT

An in-vehicle relay device prevents an anomaly of a control command exchanged over networks having different transmittable data sizes in a frame. The in-vehicle relay device relays communication between multiple control devices in a vehicle over the networks to which the control devices are connected. The in-vehicle relay device receives control data from a first control network. The control data includes, in a frame, a plurality of control commands to be executed by at least one of the control devices. The in-vehicle relay device determines, as a first determination, whether types of the control commands included in the frame form a first combination that is preset as a combination of control commands
(Continued)

that are executable simultaneously. The in-vehicle relay device thereafter determines, as a second determination, whether the control data is anomalous by using the result of the first determination, and outputs the result of the second determination.

20 Claims, 14 Drawing Sheets

Related U.S. Application Data a continuation of application No. PCT/JP2017/027120, filed on Jul. 26, 2017.

(51) Int. Cl.
*H04L 12/46* (2006.01)
*H04L 69/08* (2022.01)
*H04W 88/16* (2009.01)
*H04W 92/02* (2009.01)

(52) U.S. Cl.
CPC .......... *H04L 12/4633* (2013.01); *H04L 69/08* (2013.01); *H04W 4/40* (2018.02); *H04W 88/16* (2013.01); *H04W 92/02* (2013.01); *H04L 2012/40215* (2013.01); *H04L 2012/40273* (2013.01)

(56) References Cited

U.S. PATENT DOCUMENTS

| | | |
|---|---|---|
| 2015/0229741 A1 | 8/2015 | Kim et al. |
| 2016/0205194 A1 | 7/2016 | Kishikawa et al. |
| 2017/0278320 A1* | 9/2017 | Isozaki .............. G06F 13/4027 |
| 2018/0102886 A1* | 4/2018 | Yamada ................ H04L 5/0044 |
| 2018/0324640 A1 | 11/2018 | Kaneko et al. |
| 2018/0367546 A1 | 12/2018 | Miyashita |
| 2019/0058611 A1* | 2/2019 | Maeda ................... H04L 12/28 |
| 2019/0173952 A1* | 6/2019 | Tauchi ................... H04L 67/12 |

FOREIGN PATENT DOCUMENTS

| | | |
|---|---|---|
| EP | 3133774 A1 | 2/2017 |
| JP | 2003-195909 | 7/2003 |
| JP | 2015-154481 | 8/2015 |
| WO | 2015/170451 | 11/2015 |
| WO | 2016/204081 A1 | 12/2016 |
| WO | 2017/090351 | 6/2017 |

OTHER PUBLICATIONS

English Translation of Chinese Search Report dated Jun. 18, 2021 for Chinese Patent Application No. 201880004048.6.
International Search Report of PCT application No. PCT/JP2017/027120 dated Oct. 24, 2017.
International Search Report of PCT application No. PCT/JP2018/027011 dated Oct. 9, 2018.

* cited by examiner

| CONTROL ID | REMOTE CONTROL FLAG | Option field |
|---|---|---|
| CONTROL COMMAND ID a | | CONTROL COMMAND DATA a |
| CONTROL COMMAND ID b | | CONTROL COMMAND DATA b |
| CONTROL COMMAND ID c | | CONTROL COMMAND DATA c |
| ⋮ | | ⋮ |

| CONTROL ID | TYPE OF CONTROL |
|---|---|
| 0x01 | PULL-OFF A |
| 0x02 | PULL-OFF B |
| 0x03 | DETOUR A |
| ⋮ | ⋮ |

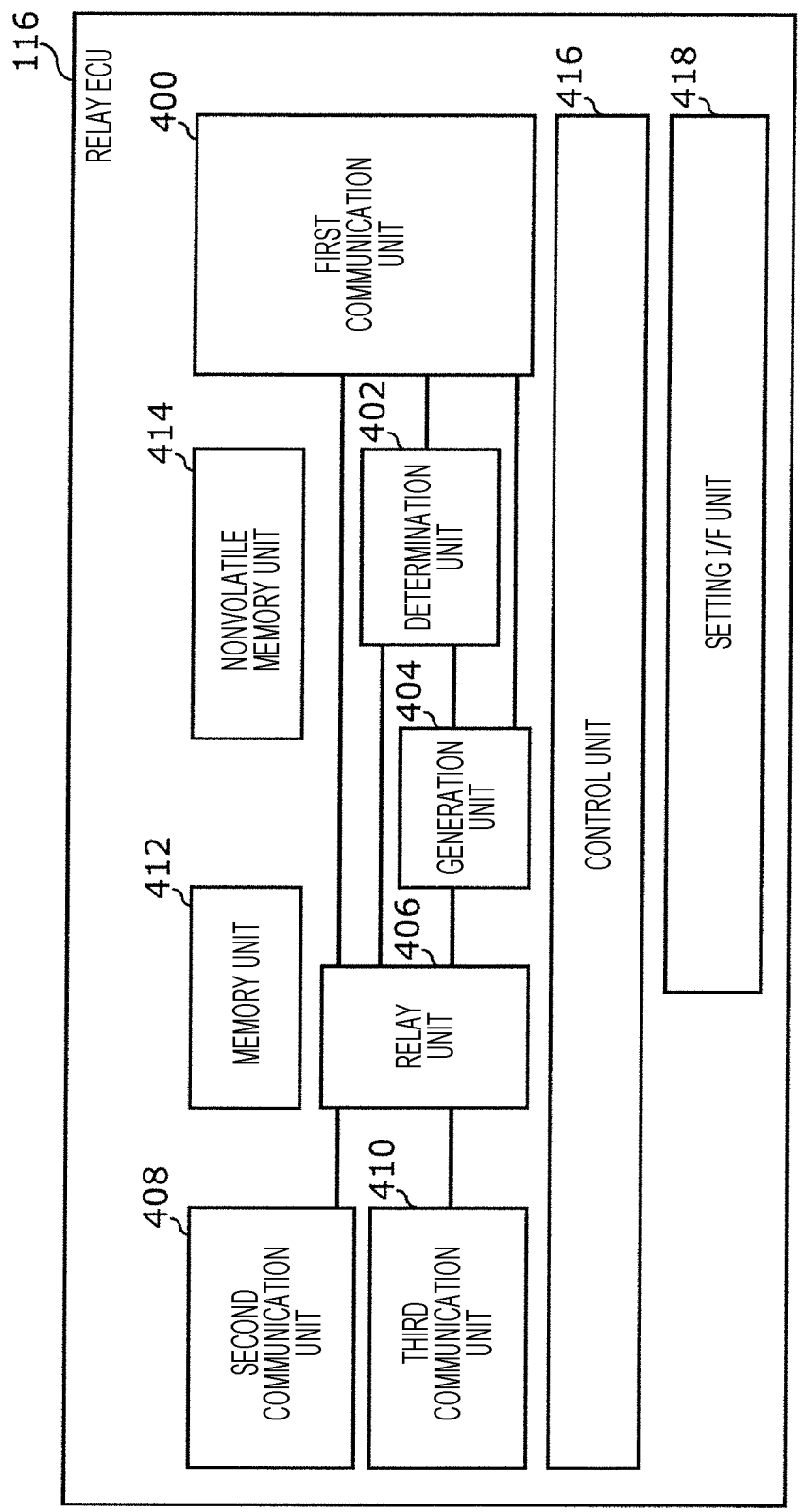

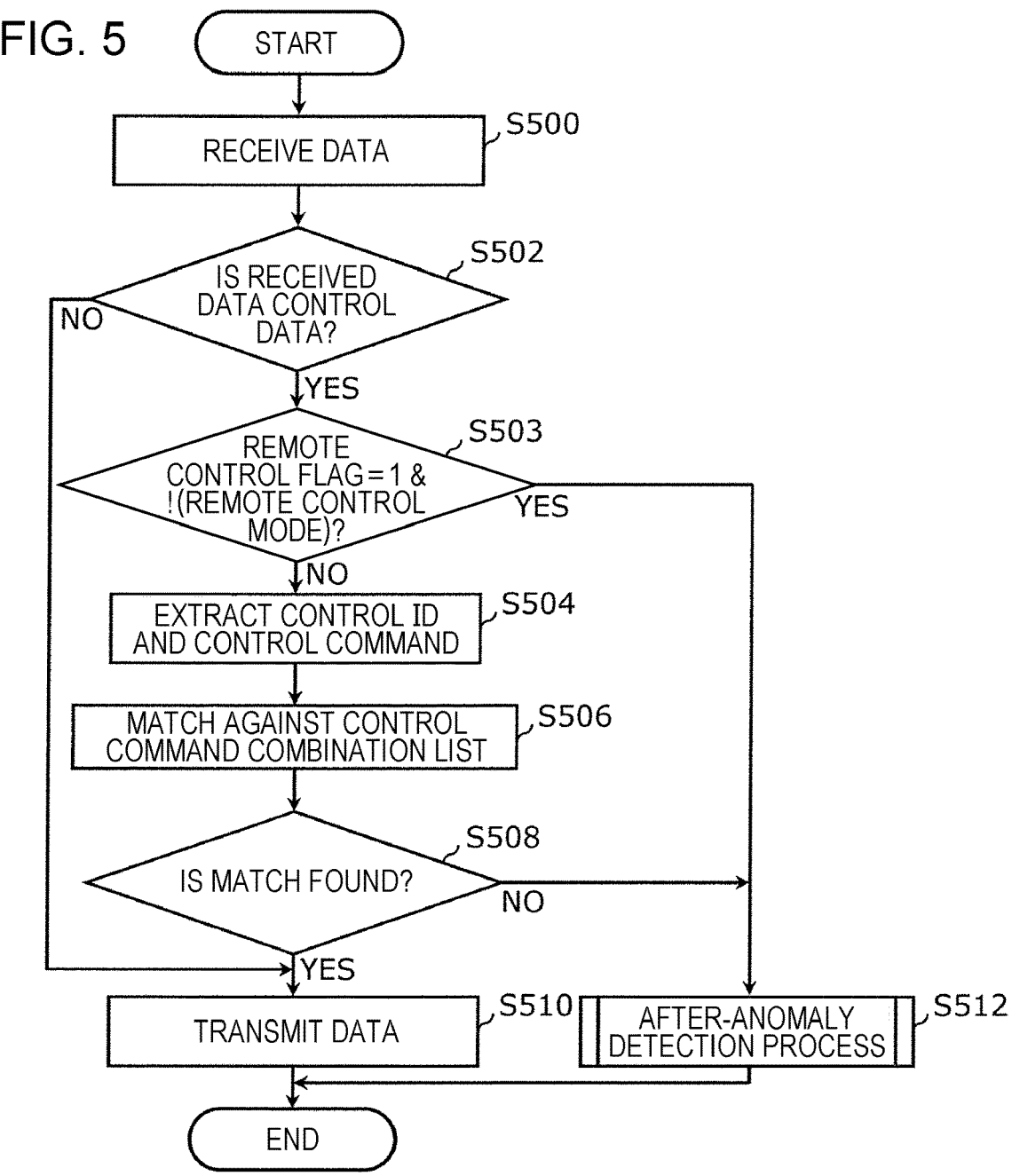

FIG. 7

```
START OF AFTER-ANOMALY
DETECTION PROCESS
        ↓
GENERATE ANOMALY        S700
MESSAGE PACKET
        ↓
TRANSMIT ANOMALY        S702
MESSAGE PACKET
        ↓
END OF AFTER-ANOMALY
DETECTION PROCESS
```

FIG. 8

| CONTROL COMMAND ID | CAN ID |
|---|---|
| 0x01 | CAN ID p |
| 0x02 | CAN ID q |
| 0x03 | CAN ID r |

| CONTROL COMMAND ID | | CONTROL COMMAND ID | | | |
|---|---|---|---|---|---|
| | | 0x01 | 0x02 | 0x03 | 0x04 |
| CONTROL COMMAND ID | 0x01 | | CT1 | CT2 | CT3 |
| | 0x02 | | | CT4 | CT5 |
| | 0x03 | | | | |
| | 0x04 | | | | |

| CONTROL COMMAND ID : 0x01 | CONTROL COMMAND ID : 0x02 |
|---|---|
| steering angle data > 30 | accelerator instruction data > 100 |
| steering angle data < -30 | accelerator instruction data > 100 |

| CONTROL COMMAND ID : 0x01 | CONTROL COMMAND ID : 0x03 |
|---|---|
| steering angle data > 40 | brake instruction data > 200 |
| steering angle data < -40 | brake instruction data > 200 |

| CONTROL COMMAND ID : 0x01 | CONTROL COMMAND ID : 0x04 |
|---|---|
| steering angle data > 10 | left turn signal light flashing instruction |
| steering angle data < -10 | right turn signal light flashing instruction |

| CONTROL COMMAND ID : 0x02 | CONTROL COMMAND ID : 0x03 |
|---|---|
| accelerator instruction data > 5 | brake instruction data > 200 |

| CONTROL COMMAND ID : 0x02 | CONTROL COMMAND ID : 0x03 |
|---|---|
| accelerator instruction data > 30 | hazard light flashing instruction |

FIG. 18A

| CONTROL ID a | Option field |
|---|---|
| CONTROL COMMAND ID a | CONTROL COMMAND DATA a |
| CONTROL COMMAND ID b | CONTROL COMMAND DATA b |
| CONTROL COMMAND ID c | CONTROL COMMAND DATA c |
| ⋮ | ⋮ |

FIG. 18B

| CONTROL COMMAND ID a | CONTROL COMMAND DATA a |
|---|---|
| CONTROL COMMAND ID b | CONTROL COMMAND DATA b |
| CONTROL COMMAND ID c | CONTROL COMMAND DATA c |
| ⋮ | ⋮ |

FIG. 18C

| CONTROL ID | Option field |
|---|---|
| CAN DATA A | |
| CAN DATA B | |
| CAN DATA C | |
| ⋮ | |

# IN-VEHICLE RELAY DEVICE, IN-VEHICLE MONITORING DEVICE, IN-VEHICLE NETWORK SYSTEM, COMMUNICATION MONITORING METHOD, AND RECORDING MEDIUM

BACKGROUND

1. Technical Field

The present disclosure relates to a relay device or the like that relays communication between a plurality of control networks in an in-vehicle network.

2. Description of the Related Art

The sophistication of electronic control technology for automobiles and the widespread use of connection of in-vehicle devices with a communication network give rise to the security risk to information for automobiles. Accordingly, the countermeasure technology is required. For example, CAN (Controller Area Network) standards have been employed for backbone networks of automobiles. Existing security countermeasure technologies for the in-vehicle network of the CAN include a technique for detecting anomaly by receiving periodically sent data frames and matching the transmission period against a predetermined rule regarding a transmission period (refer to, for example, International Publication WO 2015/170451).

Recently, the sophistication of connection with a communication network outside the vehicle and the advancement and increase in the capacity of the processing information give rise to use of Ethernet (registered trademark) as an alternative of the existing CAN in-vehicle network standard. Ethernet provides the data size per transaction that is much larger than that in CAN. Accordingly, a technique has been developed for putting together data corresponding to a plurality of CAN frames into an Ethernet frame in accordance with the order of transmission/reception of the data and transmitting the data (refer to, for example, International Publication WO 2017/090351).

SUMMARY

However, further improvement is required for the above-described existing configuration.

In one general aspect, the techniques disclosed here feature an in-vehicle relay device that relays communication between a plurality of control devices in a vehicle over a plurality of networks to which the plurality of control devices are connected. The in-vehicle relay device includes a communication circuit that receives control data from a first control network included in the plurality of networks, where the control data includes, in a frame, a plurality of control commands to be executed by at least one of the control devices, and a processor that determines, as a first determination, as to whether types of the control commands included in the frame form a first combination that is preset as a combination of control commands that are executable simultaneously, determines, as a second determination, as to whether the control data is anomalous by using a result of the first determination, and outputs a result of the second determination.

According to the in-vehicle relay device or the like of the present disclosure, further improvement can be achieved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a diagram illustrating the format of a control frame for remote control according to the first embodiment;

FIG. 3 is a diagram illustrating an example of a control ID table describing a correspondence between a control ID and the type of control indicated by the control ID according to the first embodiment;

FIG. 4 is a block diagram illustrating an example of the configuration of a relay ECU according to the first embodiment;

FIG. 5 is a flowchart illustrating an example of the procedure for the operation performed by the relay ECU according to the first embodiment;

FIG. 6 is a diagram illustrating a control command combination list according to the first embodiment;

FIG. 7 is a flowchart illustrating an example of the procedure for a after-anomaly detection process performed by the relay ECU according to the first embodiment;

FIG. 8 is a diagram illustrating a control command ID conversion table according to the first embodiment;

FIG. 10 is a diagram illustrating a value check combination list according to the second embodiment;

FIG. 11A is a diagram illustrating a check table used to check control data values according to the second embodiment;

FIG. 11B is a diagram illustrating a check table used to check control data values according to the second embodiment;

FIG. 11C is a diagram illustrating a check table used to check control data values according to the second embodiment;

FIG. 11D is a diagram illustrating a check table used to check control data values according to the second embodiment;

FIG. 11E is a diagram illustrating a check table used to check control data values according to the second embodiment;

FIG. 18A is a diagram illustrating another example of the format of a control frame for remote control;

FIG. 18B is a diagram illustrating another example of the format of a control frame for remote control; and FIG. 18C is a diagram illustrating another example of the format of a control frame for remote control.

DETAILED DESCRIPTION

Figure 1:
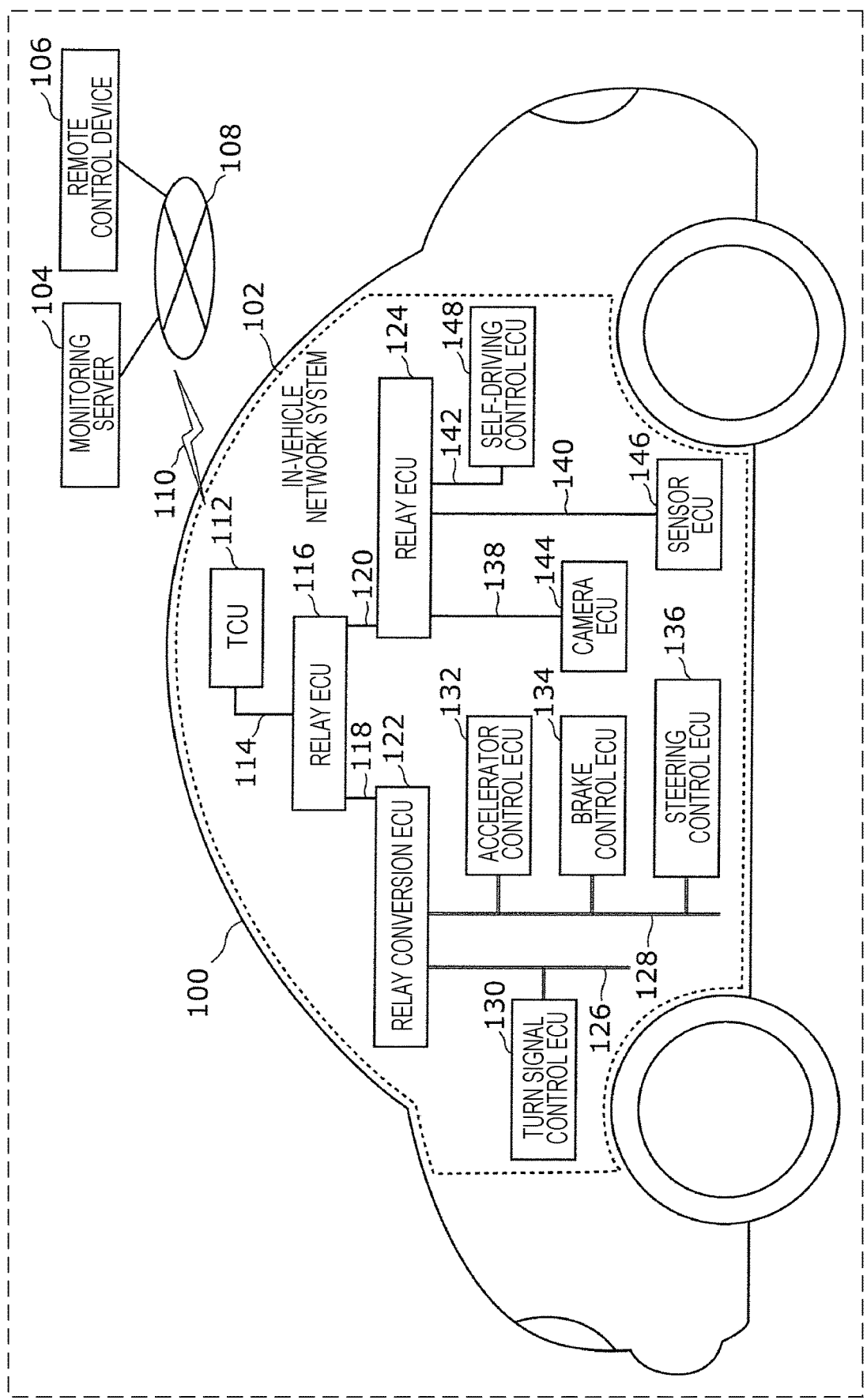
FIG. 1 is a diagram illustrating an example of the configuration of a vehicle external communication network including an in-vehicle network system and a remote control device according to first and second embodiments.

Underlying Knowledge Forming Basis of the Present Disclosure

The above-described existing configuration has a first problem in that if an in-vehicle network includes a CAN control network and an Ethernet control network, anomaly determination using the transmission periodicity lacks reliability, since the configuration of the Ethernet network is not of a bus type. In addition, in the above-described existing configuration, a single Ethernet frame including control data corresponding to a plurality of CAN frames does not always include a series of CAN control commands to be processed continuously or in a short time. For this reason, a series of control commands may be set in a plurality of different Ethernet frames and may be transmitted separately. At this time, according to Ethernet, delivery of a frame may fail, and the undelivered frame is retransmitted. However, when the undelivered frame is retransmitted, a second problem occurs. That is, a control device (hereinafter also referred to as an "ECU (Electronic Control Unit)") connected to the CAN network may not correctly control the vehicle due to the occurrence of mismatch between the order in which a plurality of control commands are processed and the order in which the control commands are received or due to a situation in which a plurality of control commands to be processed within a certain period of time are not received within the certain period of time. Accordingly, the present inventors have conceived the idea of the aspects of the present disclosure. According to an aspect of the present disclosure, an in-vehicle relay device is provided that relays communication between a plurality of control devices in a vehicle over a plurality of networks to which the plurality of control devices are connected. The in-vehicle relay device includes a communication circuit that receives control data from a first control network included in the plurality of networks, where the control data includes, in a frame, a plurality of control commands to be executed by at least one of the control devices, and a processor that determines, as a first determination, whether types of the control commands included in the frame form a first combination that is preset as a combination of control commands that are executable simultaneously, determines, as a second determination, whether the control data is anomalous by using a result of the first determination, and outputs a result of the second determination.

In this way, the occurrence of an anomaly of a frame that carries control data including a plurality of control command can be determined without depending on the transmission period of the control commands. Note that as used herein, the term "simultaneous execution of a plurality of control commands" refers to execution of a combination of control commands selected from among a plurality of types of control commands related to an acceleration instruction, a deceleration instruction, a steering instruction, and a turn signal instruction in parallel, in sequence, or in a very short time (within several seconds). In addition, the term "simultaneously executable" means that there is no inconsistency in a combination of the types of control commands to be executed simultaneously. Still note that an "anomaly of control data" is not limited to the occurrence of improper data caused by a cyber attack against a control network. For example, an "anomaly of control data" as used herein may be caused by a difference between the specifications of control networks included in the in-vehicle network system, a difference between the specifications mixed in a control network system, or a malfunction of a device that constitutes the communication network.

In addition, for example, when the processor determines that the combination of types of the control commands is not the first combination in the first determination, the processor may determine that an anomaly of the control data occurs in the second determination.

In this way, if a combination of a plurality of types of control commands included in the control data is not a known combination that does not cause danger even when they are simultaneously executed, execution of these control commands can be avoided and, thus, the safety of the vehicle is ensured.

In addition, for example, the control data may further include a control ID indicating a type of the control, and the first combination may be set for the type of control indicated by the control ID.

In this manner, unless the combination of the types of control commands included in the control data is a known combination for controlling a predetermined operation performed by the vehicle, the combination can be prevented from being used in the in-vehicle network system. As a result, the safety of the vehicle can be ensured. As used herein, the term "predetermined operation performed by the vehicle" refers to control needed for operations such as cruise control, a lane change, overtaking, parallel parking, obstacle avoidance, and pull-off to the shoulder when in danger, which are performed under automatic control. The control ID is used to identify the control of such an operation.

In addition, for example, the processor may further acquire state data indicating the state of the vehicle, and the first determination may be made by using the first combination that varies in accordance with the state indicated by the state data. More specifically, for example, the state data may be data based on data transmitted by at least one of the control devices.

In this manner, the combination of the types of control commands simultaneously executable on the in-vehicle network system can be dynamically changed in accordance with the state of the vehicle. Thus, for example, it can be determined whether a combination of a plurality of control commands can be safely executed in accordance with a variety of states of a vehicle that is traveling. The variety of states of the vehicle can be obtained from the data transmitted by the control device (i.e., an ECU) in the vehicle as needed. Consequently, the presence/absence of an anomaly of the control data can be determined in accordance with a condition (e.g., the vehicle speed) that may vary at any time and that may change the level of danger depending on the magnitude thereof when the control thereof is combined with control of increased acceleration or control of increased turn of a steering wheel.

In addition, for example, the processor may further determine, as a third determination, whether a combination of information in the control commands is a second combination that is preset for the first combination, and outputs a result of the third determination when the processor determines that the combination of the types of control commands is the first combination in the first determination. When the processor determines that the combination of information in the control commands is not the second combination in the third determination, the processor may determine that the control data is anomalous. More specifically, for example, the second combination may be a combination of predetermined value ranges within each of which an operational amount included in one of the control commands is to be included. Furthermore, for example, the processor may further acquire state data indicating the state of the vehicle and use the predetermined value ranges that vary in accordance with the state indicated by the state data.

In this manner, even a plurality of control commands that are not determined to be anomalous on the basis of the combination of the types are not executed if, for example, the combination of detailed information about the control operations indicated by the control data values is not a known combination that does not cause danger when the control commands are simultaneously executed. This leads to further improvement of the safety of the vehicle. In some control operations, the safety may be impaired depending on the operational amount, which is detailed information about the control operation. For example, a combination of steering control and acceleration control appears in normal overtaking. If the operational amount of each of the control operations is appropriately small, the two operations performed at the same time do not cause danger. However, if the control operations are performed with a large steering angle and a large acceleration, the vehicle may skid or roll over. According to the above-described configuration, a combination of control operations that causes the vehicle to skid or roll over can be avoided. Furthermore, for example, it can be determined whether a combination of a plurality of control commands can be safely executed for a variety of states of a vehicle that is traveling.

In addition, for example, the in-vehicle relay device may further include a relay circuit. When the processor determines that the control data is not anomalous, the relay circuit may transmit the plurality of control commands to a second control network of the plurality of control networks, the second control network may differ from the first control network, and the second control network is a predetermined destination corresponding to each of the control commands.

As a result, a plurality of control commands determined, without using the transmission period, not to cause a problem of the vehicle itself or the travel of the vehicle even when the control commands are combined and simultaneously executed are acquired and executed by the corresponding control devices.

In addition, for example, the control data may further include control command IDs each indicating a type of one of the plurality of control commands. The relay circuit may convert a control command ID that is attached to a control command to be transmitted and that indicates a type of the control command into a control command ID in accordance with a predetermined conversion rule and transmits the control data to the second control network. Furthermore, the relay circuit may convert each of the plurality of control commands in accordance with a predetermined conversion rule and, thereafter, transmit converted control commands. Still furthermore, for example, largest data size of the control command transmittable in the one frame in the first control network may be larger than largest data size of the control command transmittable in one frame in the second control network, and the relay circuit may separate a plurality of control commands included in the frame of the control data received from the first control network into a plurality of frames and transmit separated frames to the second control network. More specifically, for example, the first control network and the second control network may comply with different standards. Still more specifically, among the different standards, a standard with which the first control network complies may be Ethernet (registered trademark), and a standard with which the second control network complies may be CAN (Controller Area Network).

In this way, for example, in a control network system in which control data is communicated across a plurality of control networks that comply with different standards or a plurality of control networks that comply with the same standard but have different control data size transmittable in one frame, an anomaly determination is more reliably made on a frame including a plurality of control commands by using a technique that does not require use of the transmission period.

According to another aspect of the present disclosure, an in-vehicle monitoring device is provided that is included in an in-vehicle network having a first control network and a second control network between which communication is relayed by a relay device and that is connected to the first control network. The in-vehicle monitoring device includes a communication circuit that receives control data transmitted from a control device connected to the first control network, where the control data includes, in a frame, a plurality of control commands for control to be performed by a control device connected to the second control network, and a processor that determines, as a first determination, whether types of the control commands included in the frame form a first combination that is preset as a combination of control commands that are executable simultaneously, determines, as a second determination, whether the control data is anomalous by using a result of the first determination, and outputs a result of the second determination. Largest data size of the control command transmittable in one frame in the first control network is larger than the largest data size of a control command transmittable in one frame in the second control network.

In this way, the presence/absence of an anomaly can be determined for one frame that carries control data including a plurality of control commands, without depending on the transmission period of the control commands.

According to still another aspect of the present disclosure, a communication monitoring method for use of an in-vehicle relay device that relays communication between a plurality of control devices in a vehicle over a plurality of networks to which the plurality of control devices are connected is provided. The in-vehicle relay device includes a communication circuit and a processor. The method includes receiving, by the communication circuit, control data from a first control network included in the plurality of networks, the control data including, in a frame, a plurality of control commands to be executed by at least one of the control devices, determining, by the processor, a first determination as to whether types of the control commands included in the frame form a first combination that is preset as a combination of control commands that are executable simultaneously, determining, by the processor, a second determination as to whether the control data is anomalous by using a result of the first determination, and outputting, by the processor, a result of the second determination.

In this manner, the presence/absence of an anomaly of a frame that carries control data including a plurality of control commands can be determined without depending on the transmission period of the control commands.

According to yet still another aspect of the present disclosure, a non-transitory computer-readable recording medium storing a program for use in an in-vehicle relay device is provided. The in-vehicle relay device relays communication between a plurality of control devices in a vehicle over a plurality of networks to which the plurality of control devices are connected. The in-vehicle relay device includes a communication circuit and a processor. The program includes a program code executing a method, when the program is executed by the processor. The method includes receiving, by the communication circuit, control data from a first control network included in the plurality of networks, the control data including, in a frame, a plurality of control commands to be executed by at least one of the control devices, determining, as a first determination, whether types of the control commands included in the frame form a first combination preset as a combination of control commands executable simultaneously, determining, as a second determination, whether the control data is anomalous by using a result of the first determination, and outputting a result of the second determination.

In this manner, the presence/absence of an anomaly of a frame that carries control data including a plurality of control commands can be determined without depending on the transmission period of the control commands.

According to yet still another aspect of the present disclosure, an in-vehicle network system includes a first control network and a second control network having a plurality of control devices connected thereto, that facilitate communication between the control devices being relayed by an in-vehicle relay device. Largest data size of the control command transmittable in one frame in the first control network is larger than the largest data size of a control command transmittable in one frame in the second control network, and the control data transmitted from the first control network to the second control network includes, in one frame, a combination of a plurality of control commands that cause control devices connected to the second control network to perform predetermined control operations simultaneously. In addition, for example, the combination of the control commands may be a combination of control commands that are executable simultaneously and set for a predetermined type of control. Furthermore, for example, the control data may further include a control ID indicating a type of control corresponding to a combination of the control commands.

In such a network system, the presence/absence of an anomaly of a frame that carries control data including a plurality of control commands can be determined without depending on the transmission period of the control commands.

It should be noted that general or specific embodiments may be implemented as a system, a method, an integrated circuit, a computer program, a computer-readable recording medium, such as a CD-ROM, or any selective combination thereof.

In-vehicle network systems each including a plurality of control networks in which communication between control devices is relayed by an in-vehicle relay device according to embodiments are described below with reference to the accompanying drawings. Each of the embodiments described below represents one specific example of the present disclosure. Therefore, a value, a constituent element, the positions and the connection form of the constituent elements, steps (operations), and the sequence of steps used in the embodiments are only examples and shall not be construed as limiting the scope of the present disclosure. Among the constituent elements in the embodiments described below, the constituent element that does not appear in an independent claim, which has the broadest scope, is described as an optional constituent element. In addition, all the drawings are schematic and not necessarily to scale.

<Overview of In-Vehicle Network System>

FIG. 1 is a diagram illustrating an example of the configuration of an in-vehicle network system commonly used as an example in first and second embodiments.

A vehicle 100 has an in-vehicle network system 102 mounted therein. In the following description, it is assumed that the vehicle 100 has a self-driving capability and is based on a technology regarding state monitoring and remote control via a communication network, which can be put to practical use in the near future.

The in-vehicle network system 102 includes a CAN network constructed according to CAN, an Ethernet network constructed according to Ethernet, a plurality of ECUs, and a communication control unit (hereinafter referred to as "TCU (Telematics Control Unit)") 112.

The CAN network of the in-vehicle network system 102 includes a first CAN communication line 126 and a turn signal control ECU 130 connected to the first CAN communication line 126. The turn signal control ECU 130 performs lighting on/off control of right and left turn signals of the vehicle 100. In addition, the CAN network includes a second CAN communication line 128 and travel control ECUs connected to the second CAN communication line 128. Examples of a travel control ECU include an accelerator control ECU 132, a brake control ECU 134, and a steering control ECU 136.

The accelerator control ECU 132 performs acceleration control including starting of the vehicle 100 in accordance with the position of an accelerator pedal. The brake control ECU 134 performs a deceleration control including stoppage of the vehicle 100 in accordance with the operation performed on the brake pedal. The steering control ECU 136 performs steering control in accordance with the steering angle of the steering wheel.

These ECUs are only examples of ECUs that can be included in the CAN network, and other ECUs (not illustrated) may be included. For example, a chassis system ECU, such as a window opening/closing control ECU, connected to the first CAN communication line 126 may be part of the CAN network. In addition, for example, a travel control ECU other than the above-described ECUs may be connected to the second CAN communication line 128.

Furthermore, the first CAN communication line 126 and the second CAN communication line 128 are relay connected to a second Ethernet communication line 118 (described below), which constitutes an Ethernet network, by the first relay conversion ECU 122. The first relay conversion ECU 122 is described in more detail below.

The Ethernet network of the in-vehicle network system 102 includes a first Ethernet communication line 114, a second Ethernet communication line 118, a third Ethernet communication line 120, a fourth Ethernet communication line 138, a fifth Ethernet communication line 140, a sixth Ethernet communication line 142, a relay ECU 116 and a second relay ECU 124 that relay connect these Ethernet communication lines with one another, and a camera ECU 144, a sensor ECU 146, and a self-driving control ECU 148 connected to these Ethernet communication lines. More specifically, the relay ECU 116 relay connects the first Ethernet communication line 114 with each of the second Ethernet communication line 118 and the third Ethernet communication line 120. The second relay ECU 124 relay connects the third Ethernet communication line 120 with each of the fourth Ethernet communication line 138, the fifth Ethernet communication line 140, and the sixth Ethernet communication line 142.

The relay ECU 116 has the function of an Ethernet Switch. The relay ECU 116 refers to the address included in a received frame and transmits the frame to a destination corresponding to the address.

The second relay ECU 124 is an ECU having an Ethernet Switch function. The second relay ECU 124 relay connects the third Ethernet communication line 120 with each of the fourth Ethernet communication line 138, the fifth Ethernet communication line 140, and the sixth Ethernet communication line 142 and performs data transfer with the ECU connected in accordance with the destination of the received data.

The camera ECU 144 controls a camera (not illustrated) that captures the image of the surroundings of the vehicle 100 to generate video data. Thereafter, the camera ECU 144 delivers the video data to the in-vehicle network 102. The sensor ECU 146 controls a sensor (not illustrated) that senses the surrounding condition for the vehicle 100. Thereafter, the sensor ECU 146 delivers the sensing result to the in-vehicle network 102 as sensing data. The self-driving control ECU 148 performs self-driving control on the vehicle 100 on the basis of the data transmitted from the camera ECU 144 and the sensor ECU 146 and received via the second relay ECU 124. The self-driving control ECU 148 performs the self-driving control on the vehicle 100 by transmitting a control command to ECUs related to driving control, that is, the accelerator control ECU 132, the brake control ECU 134, and the steering control ECU 136. That is, control data including a control command for self-driving control is transmitted from the Ethernet network to the CAN network.

Exchange of data between the CAN network and the Ethernet network is achieved by the first relay conversion ECU 122 that relay connects the relay ECU 116 with the first CAN communication line 126 and the second CAN communication line 128. The first relay conversion ECU 122 is an ECU that performs bidirectional conversion of data exchanged between the Ethernet network and the CAN network in accordance with the protocols of two standards. More specifically, the first relay conversion ECU 122 generates a frame of the CAN format including a control command from a frame of the Ethernet format including the control command received from the second Ethernet communication line 118 and transmits the generated CAN frame to at least one of the first CAN communication line 126 and the second CAN communication line 128 in accordance with the type of the CAN frame. In addition, the first relay conversion ECU 122 generates an Ethernet frame on the basis of a frame of the CAN format received from the first CAN communication line 126 or the second CAN communication line 128 and transmits the generated Ethernet frame to the second Ethernet communication line 118.

In addition, the in-vehicle network system 102 is connected to a vehicle external communication network 108 by using wireless communication 110 performed by the TCU 112 connected to the first Ethernet communication line 114. Furthermore, the TCU 112 is connected to the first relay conversion ECU 122 and the second relay ECU 124 via the relay ECU 116.

An example of the vehicle external communication network 108 is a communication network such as the Internet. The in-vehicle network system 102 is connected to a monitoring server 104 and a remote control device 106 via the vehicle external communication network 108. The monitoring server 104 and the remote control device 106 are implemented, for example, by executing a predetermined program in one or more information processing apparatuses each including a processor, a storage device, an input/output device, and a communication device. Alternatively, the monitoring server 104 and the remote control device 106 may be integratedly implemented integrated in the same information processing apparatus.

The monitoring server 104 receives, from the vehicle 100, positional information acquired by an in-vehicle GPS (Global Positioning System) receiver (not illustrated), the video data generated by the camera, or sensing data generated by the sensors via the vehicle external communication network 108. Thereafter, the monitoring server 104 monitors the state of the vehicle 100 by using the received information.

Upon receiving a remote control request from the vehicle 100 via the vehicle external communication network 108 or upon receiving a forced remote control request for the vehicle 100 from the monitoring server 104 monitoring the state of the vehicle 100, the remote control device 106 transmits remote control data to the vehicle 100.

Like the above-described control data transmitted from the self-driving control ECU 148, the remote control data transmitted from the remote control device 106 includes a control command for the travel system ECUs of the vehicle 100. The control command included in the remote control data has an Ethernet format. When the control command is received by the TCU 112, the control command is delivered to the first relay conversion ECU 122 via the Ethernet network of the in-vehicle network system 102. The first relay conversion ECU 122 converts the control command into the CAN format and transmits the control command to the CAN network including the travel control system ECUs or the turn signal control ECU.

In the in-vehicle network system 102 described above, a control command sent from the self-driving control ECU 148 in the vehicle or the remote control device 106 outside the vehicle is delivered to the first relay conversion ECU 122 via the Ethernet network. However, the control command is subsequently delivered to the control ECU that executes each of control commands via the CAN network. The largest size of the control data that can be delivered in one frame of the CAN network is 64 bits (8 bytes), which is the prescribed length of the data field. In contrast, the size of the control data that can be delivered in one frame of the Ethernet network is much larger than 64 bits. To efficiently deliver the control data in the in-vehicle network system 102, control data of a size corresponding to control data delivered in a plurality of CAN frames is included in one Ethernet frame. That is, control data that groups a plurality of control commands is stored in one Ethernet frame. Thereafter, through a process of generating CAN frames from one Ethernet frame, the plurality of control commands are separated into a plurality of CAN frames. Note that in the generation process, data addition, data deletion, or data conversion may be performed as necessary so that the control commands conform to the specifications of the implemented in-vehicle network 102.

Among the constituent elements of the in-vehicle network system 102, each of the Ethernet network and the CAN network is an example of a control network according to the embodiments described below. In addition, each of the ECUs is an example of a control device according to the embodiments described below, and each of the relay ECU and the relay conversion ECUs is an example of an in-vehicle relay device according to the embodiments described below.

Note that the configuration of the in-vehicle network system 102 described above is an example of the configuration to which the embodiments described below can be commonly applied, and each of the embodiments is applicable to an in-vehicle network system having a configuration that differs from the above configuration. Other examples of the configuration of an in-vehicle network system to which each of the embodiments is applicable is described below as modifications of the embodiment.

First Embodiment

An example of anomaly determination made on control data by the in-vehicle network system 102 is described below.

The anomaly determination is made on control data that includes a control command and that is transmitted from the Ethernet network to the control ECU in the CAN network. The transmission source of the control data is the remote control device 106. The control data is included in an Ethernet frame and is transmitted. The control data anomaly determination is made by the relay ECU 116.

In the following description of a determination as to an anomaly, the case where the relay ECU 116 makes a determination as to an anomaly of the control data transmitted from the self-driving control ECU 148 or the remote control device 106 is discussed as an example.

An example of a situation in which control data destined for a control ECU in a CAN network is transmitted from the self-driving control ECU 148 or the remote control device 106 is described first.

For example, in the vehicle 100 that is self-driving, the self-driving control ECU 148 recognizes the state of the vehicle body and the surrounding situation on the basis of the information indicated by the video data and the sensing data transmitted from the camera ECU 144 and the sensor ECU 146, respectively. Subsequently, the self-driving control ECU 148 makes a determination as to details of a control operation performed on the vehicle 100 on the basis of the recognition and, thereafter, transmits control data including a series of control commands reflecting the information regarding a control operation to the accelerator control ECU 132, the brake control ECU 134, and the steering control ECU 136.

In addition, for example, a state of the vehicle body or the surrounding situation that differs from a normal one may occur during self-driving and, thus, the case where the self-driving control ECU 148 cannot perform control may occur. Examples of such a case include the case where a policeman helps with traffic control due to, for example, a road construction that requires a detour or the occurrence of a traffic accident and the case where an emergency vehicle is approaching and, thus, the vehicle 100 needs to pull over to the edge of the roadway. If such a case occurs, the self-driving control ECU 148 determines that it is impossible to control the vehicle 100 by its own determination and transmits a remote control request destined for the remote control device 106. The remote control request is delivered to the remote control device 106 via the second relay ECU 124, the relay ECU 116, and the TCU 112 via the vehicle external communication network 108. Furthermore, the relay ECU 116 and the self-driving control ECU 148 that have transmitted the remote control request enter a remote control mode.

In addition, for example, the monitoring server 104 monitors the vehicle 100 on the basis of the state of the vehicle indicated by the positional information, the video data, and the information indicated by the sensing data and the recognition of the surrounding situation, which are sent from the vehicle 100. If the monitoring server 104 determines that remote control is necessary for the vehicle 100 on the basis of the recognition, the monitoring server 104 transmits, to the remote control device 106, a remote control request for the vehicle 100 and transmits, to the relay ECU 116 and the self-driving control ECU 148 of the vehicle 100, a forced remote control message via the vehicle external communication network 108. Upon receiving the forced remote control message, the relay ECU 116 and the self-driving control ECU 148 enter the remote control mode.

Upon receiving the above-described remote control request for the vehicle 100 from the vehicle 100 or the monitoring server 104, the remote control device 106 determines the details of the control operation performed on the vehicle 100 on the basis of the positional information and the state of the vehicle 100 and the recognition of the surrounding situation base on the video data and sensing data, which are received from the vehicle 100. For example, before the determination as to the details of the control operation is made, a monitoring staff may perform an input operation. Alternatively, information processing may be performed by a self-driving program that is more advanced than in the self-driving control ECU 148, or artificial intelligence may be used. Furthermore, in the remote control device 106, a control ID corresponding to the type of control corresponding to the determined details of a control operation is acquired, and a frame storing control data including a control command corresponding to the control ID and the details of a control operation (hereinafter, the frame is referred to as a "control frame") is generated. An example of the format of the control frame for remote control generated in this way is illustrated in FIG. 2.

As can be seen from a control frame format 200, one frame includes a control ID indicating the type of control and a plurality of control commands corresponding to a plurality of control operations simultaneously performed by the control ECUs. Each of the control commands includes a control command ID indicating the type of control command and control command data indicating the details of the control operation. The control command further includes a remote control flag indicating whether the control frame is for remote control or self-driving control performed by the vehicle.

FIG. 3 illustrates an example of a control ID table indicating a correspondence between the control ID and the type of control indicated by the control ID. In a control ID table 300, two types of control for pull-off (pull-off A, pull-off B) and detour control (detour A) at a construction site are illustrated as examples of the types of control operations. Note that a control ID of 0x01 is assigned to and associated with pull-off A, a control ID of 0x02 is assigned to and associated with pull-off B, and a control ID of 0x03 is assigned to and associated with detour A. The control ID table 300 is stored in the storage device of the remote control device 106, for example. A monitoring stuff or a program responsible for remote control refers to the control ID table 300, selects the type of control corresponding to the determined details of the control operation, and uses the control ID associated with the selected type of the control operation. Note that the type of control may be determined before the details of a control operation is determined.

The control frame generated by the remote control device 106 is transmitted to the vehicle 100 via the vehicle external communication network 108. To prevent wiretapping and tampering of the control frame in the vehicle external communication network 108, a session defined by TLS (Transport Layer Security) is established between the TCU 112 of the vehicle 100 and the remote control device 106. Thus, the control frame is encrypted and transmitted.

The control frame received and decrypted by the TCU 112 is transmitted to the relay ECU 116 via the first Ethernet communication line 114. An example of the configuration of the relay ECU 116 is illustrated in FIG. 4.

The relay ECU 116 includes a first communication unit 400, a second communication unit 408, a third communication unit 410, a memory unit 412, a nonvolatile memory unit 414, a determination unit 402, a generation unit 404, a relay unit 406, a control unit 416, and a setting interface (hereinafter referred to as "I/F") unit 418.

The first communication unit 400 is connected to the first Ethernet communication line 114. The first communication unit 400 exchanges data with the TCU 112 via Ethernet. The second communication unit 408 is connected to the second Ethernet communication line 118. The second communication unit 408 exchanges data with the relay conversion ECU 122 via Ethernet. The third communication unit 410 is connected to the third Ethernet communication line 120. The third communication unit 410 exchanges data with the second relay ECU 124 via Ethernet.

The determination unit 402, the generation unit 404, the relay unit 406, and the control unit 416 are functional constituent elements achieved by the processor included in the relay ECU 116 that executes a predetermined program. The program is stored in the nonvolatile memory unit 414 at the time of manufacturing the vehicle 100 and is executed by using the memory unit 412. The flowchart in FIG. 5 illustrates an example of the procedure for the operation performed by the relay ECU 116 that executes the program to determine the presence/absence of an anomaly of the control data.

The determination unit 402 determines whether the data received by the first communication unit 400 (step S500) is a control frame of the vehicle 100 first (step S502).

If, as a result of the determination, the frame is not a control frame (NO in step S502), the frame is sent to the relay unit 406. The relay unit 406 transmits the frame to at least one of the control networks via one or both of the second communication unit 408 and the third communication unit 410 in accordance with the destination of the frame (step S510).

If the received data is a control frame (YES in step S502), the determination unit 402 makes a determination regarding the remote control mode (step S503). More specifically, the determination unit 402 checks whether the control frame is for remote control on the basis of the value of the remote control flag in the control frame (refer to FIG. 2). In this example, upon confirming that the control frame is for remote control on the basis of the value of the remote control flag being 1, the determination unit 402 further determines whether the current operation mode of the relay ECU 116 is a remote control mode.

Even in the case where the control frame is for remote control, if the current operation mode of the relay ECU 116 is not the remote control mode (YES in step S503), the determination unit 402 determines that the received control frame is anomalous. The processing performed by the relay ECU 116 proceeds to an after-anomaly detection process (step S512). The after-anomaly detection process is described in more detail below.

If an anomaly is not detected in the determination regarding the remote control mode (NO in step S503), the determination unit 402 extracts the control ID and the control command ID from the control frame (step S504).

Subsequently, the determination unit 402 further matches the extracted control ID and control command ID against the control command combination list (step S506). The control command combination list is a list indicating a combination of a control ID and a plurality of control command IDs, and the plurality of control command IDs are appropriate types of control commands set for the control ID. As used herein, the term "appropriate" means that the control commands in a combination are simultaneously executable in the vehicle 100. FIG. 6 illustrates an example of a control command combination list.

A control command combination list 600 illustrated in FIG. 6 indicates that it is appropriate that the control frame corresponding to a control ID of 0x01 consists of a steering control command, a brake control command, and a turn signal control command.

The control command combination list 600 is stored in the nonvolatile memory unit 414 via the setting I/F unit 418 at the time of manufacturing the vehicle 100. In addition, even after the start of use of the vehicle 100, the control command combination list 600 may be updated by reprogramming via the setting I/F unit 418 or OTA (Over-The-Air) reprogramming.

If a match is found between the combination of the control command IDs for a control ID described in the control command combination list 600 and the actually extracted combination of the control command IDs for the control ID (YES in step S508), the determination unit 402 determines that the received control frame is not anomalous. The control frame determined not to be anomalous is sent to the relay unit 406 and is transmitted from the second communication unit 408 to the second Ethernet communication line 118 (step S510).

If a match is not found between the combination of the control command IDs for a control ID described in the control command combination list 600 and the actually extracted combination of the control command IDs for the control ID (NO in step S508) and those in the control command combination list 600, the determination unit 402 determines that the control frame is anomalous, and the processing performed by the relay ECU 116 proceeds to an after-anomaly detection process (step S512).

The after-anomaly detection process is described below. The flowchart in FIG. 7 illustrates an example of a procedure for the after-anomaly detection process according to the present embodiment.

If the determination unit 402 determines that the control frame is anomalous, the generation unit 404 generates an anomaly message packet for notifying of detection of an anomaly of the control frame (step S700). The anomaly message packet is transmitted to the relay unit 406 and the first communication unit 400 and is transmitted from the second communication unit 408 and the third communication unit 410 to the control network of the vehicle 100. In addition, the anomaly message packet is transmitted from the first communication unit 400 to the monitoring server 104 and the remote control device 106 outside the vehicle 100 (step S702).

As described above, the procedure for determination as to whether the presence/absence of an anomaly of the control data made by the relay ECU 116 according to the present embodiment is performed and completed. The determination process is performed for each of frames received by the relay ECU 116.

Upon receiving, via the second Ethernet communication line 118, the control frame determined not to be anomalous and output by the relay ECU 116, the first relay conversion ECU 122 sequentially retrieves the control commands from the control frame.

Furthermore, the first relay conversion ECU 122 converts the control command ID included in the retrieved control command into a CAN ID. For this conversion, for example, the first relay conversion ECU 122 uses the control command ID conversion table 800 illustrated in FIG. 8 as an example. The control command ID conversion table 800 is an example that defines a predetermined conversion rule for converting the control command ID transmitted in an Ethernet frame into a CAN ID used in the in-vehicle network system 102 of the vehicle 100. The control command ID conversion table 800 is stored in, for example, the nonvolatile memory unit 414 provided in the relay conversion ECU 122 at the time of manufacturing the vehicle 100.

Instead of the control command ID, the entire control command or the control command data (i.e., control command data a, b, c in FIG. 2) may be converted in accordance with a predetermined conversion rule so as to support a CAN network if the specification of the in-vehicle network system 102 requires the conversion. In this manner, a remote control system that does not depend on the configuration of CAN can be designed.

Each of the commands (hereinafter also referred to as "CAN commands") obtained through the above-mentioned conversion performed by the first relay conversion ECU 122 is sequentially transmitted to a corresponding CAN network. The correspondence between a CAN command and a CAN network is indicated by, for example, a list describing a correspondence between a CAN ID and a CAN network which is the transmission destination of the CAN ID. The list is stored in the memory unit of the first relay conversion ECU 122.

Each of the control ECUs performs its own control function in accordance with the received control command. In this way, a variety of control operations are performed on the vehicle 100.

Note that an anomaly determination process similar to that performed on the control frame generated by the remote control device 106 (except for setting of the remote control flag) is performed on a control frame generated by the self-driving control ECU 148 for self-driving control. In addition, in conversion of the control command ID or the control command data, different rules may be employed for the control frame for remote control and the control frame for self-driving control. Also note that the conversion may be performed as needed in the in-vehicle network system 102 and is not an essential process.

According to the above-described configuration, in the self-driving control ECU 148 and the remote control device 106, a control frame to be transmitted by using Ethernet consists of a data set in which control commands corresponding to the type of control are combined. As a result, control commands to be executed simultaneously are not separately set in a plurality of different Ethernet frames. Consequently, the proper order in which the control ECUs connected to the CAN network perform their own control operations can be reliably maintained. In addition, the occurrence of or an increase in a delay between the control commands can be prevented.

Furthermore, by checking whether the control data to be relayed consists of a data set in which the control commands corresponding to the type of control are combined, the relay ECU 116 detects an anomaly of the control frame. As a result, anomalous control of the vehicle 100 caused by execution of anomalous control data can be prevented.

Still furthermore, by conversion into the CAN ID using the control command ID conversion table 800, the degree of dependence of the relay ECU 116, the remote control device 106, and the self-driving control ECU 148 on the configuration of the CAN network can be reduced and, thus, the need for a change in a control command in accordance with the type of vehicle to be controlled or the manufacturer of the vehicle can be eliminated.

Second Embodiment

Like the first embodiment, the second embodiment is described with reference to an example of anomaly determination made by the in-vehicle network system 102 illustrated in FIG. 1. In the following description, differences from the first embodiment are mainly described, and description of the constituent elements and the processing procedure the same as those of the first embodiment is briefly given as needed.

Figure 9:
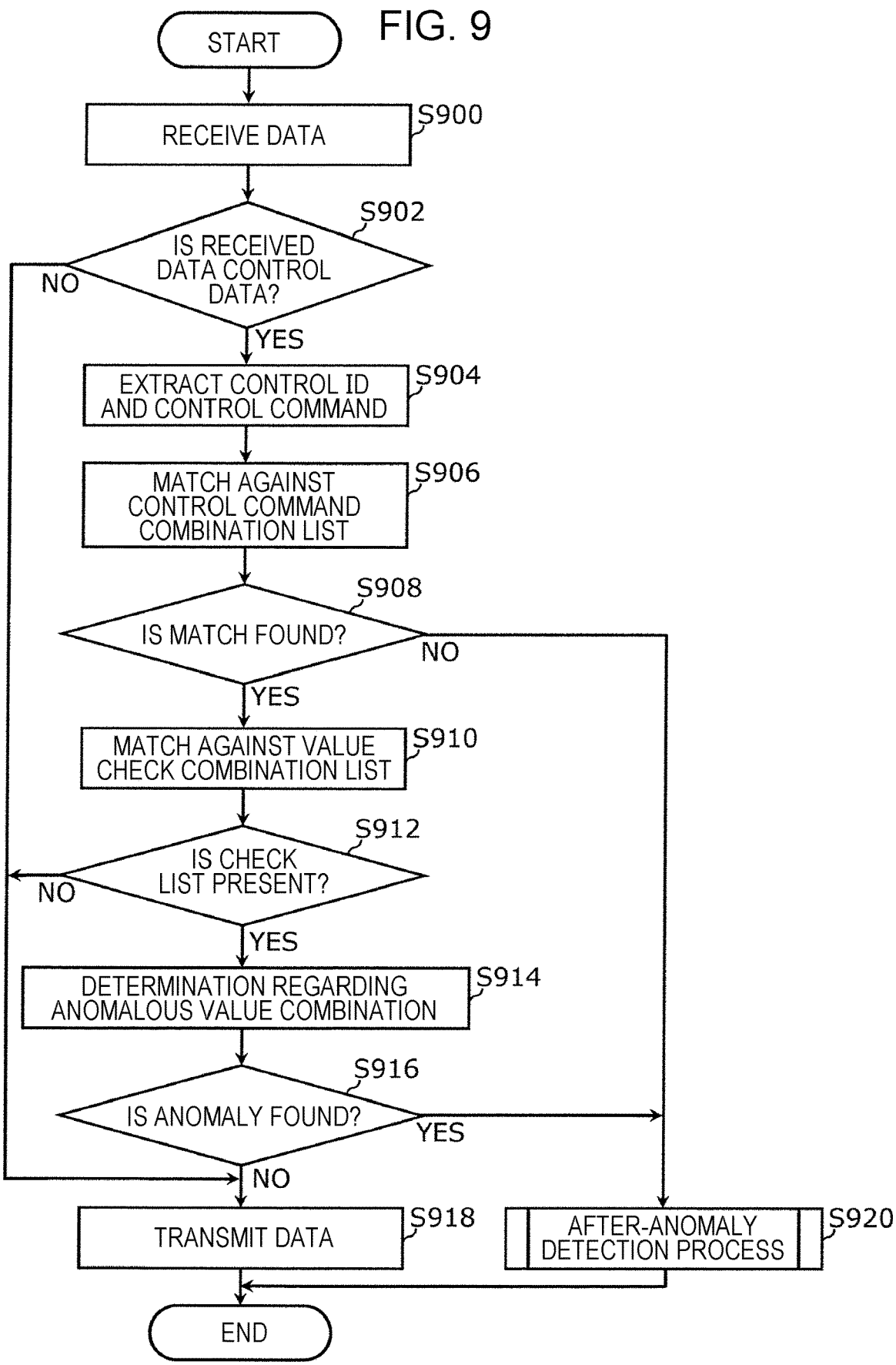
FIG. 9 is a flowchart illustrating an example of the procedure for the operation performed by a relay ECU according to a second embodiment.

According to the present embodiment, among the processing procedures for determination of an anomaly of control data made by the relay ECU 116 according to the first embodiment, the process performed in the case of "YES" in step S508, that is, the process performed in the case where a match is found as the result of the matching process using the control command combination list is modified. This is only a difference from the first embodiment. FIG. 9 is a flowchart illustrating an example of the procedure for the operation performed by the relay ECU 116 to determine the presence/absence of an anomaly of control data, according to the present embodiment.

Steps S900, S902, S904, S906, and S908 are the same as steps S500, S502, S504, S506, and S908 according to the first embodiment, respectively.

Step S918 executed when the result of determination in step S902 is NO is the same as step S510 according to the first embodiment.

In addition, step S920 executed immediately after the result of the determination in step S908 is NO is the same as step S512 according to the first embodiment.

According to the present embodiment, the step corresponding to determination regarding the remote control mode according to the first embodiment may be executed subsequent to step S902. However, for simplicity, description and the figure of the step is not repeated.

If a match is found between the combination of the control command IDs for a control ID described in the control command combination list 600 illustrated in FIG. 6 and the actually extracted combination of the control ID and control command IDs (YES in step S908), the processing performed by the determination unit 402 proceeds to a value check combination list matching process (step S910).

In the value check combination list matching process (step S910), the control command ID extracted from the control frame is matched against a value check combination list 1000 illustrated in FIG. 10. Thus, a check table used for value check is identified. For example, if three control commands having control command IDs 0x01, 0x03, and 0x04 are included in a control frame, the fields for "0x01-0x03", "0x01-0x04", and "0x03-0x04" of the value check combination list 1000 are referenced to identify the check tables. In this example, a check table CT2 and the check table CT3 are identified as check tables used for value check. Examples of check tables are illustrated in FIGS. 11A, 11B, 11C, 11D, and 11E. Note that there is no check table corresponding to the combination "0x03-0x04". This means that a combination of invalid values is not defined between the control command having a control command ID of 0x03 and the control command having a control command ID of 0x04.

Each of the check tables CT1 to CT5 indicates an anomalous combination of data values in the control commands. For example, a first one of the data rows of the check table CT1 illustrated in FIG. 11B indicates that a combination of a steering angle greater than 30 and an acceleration instruction value greater than 100 is anomalous if the control command IDs are 0x01 (steering angle) and 0x02 (accelerator instruction). When the value of the data to be checked is a numerical value, the condition may be indicated by, for example, the range of the numerical value. In addition, as indicated by the details of the turn signal control operation illustrated in the check tables CT3 and CT5, the condition may be indicated by a value that is not a numerical value or a value that is not the range of the numerical value. For example, the check table CT5 indicates that anomalous control occurs if the details of the acceleration control operation indicates an accelerator instruction value larger than 30 and the details of the turn signal light control operation indicates a "hazard light flashing instruction" (an instruction to flash both right and left turn signal lights simultaneously).

The above-described value check combination list 1000 and check tables CT1 to CT5 are stored in the nonvolatile memory unit 414 via the setting I/F unit 418 at the time of manufacturing the vehicle 100. In addition, even after the start of use of the vehicle 100, the value check combination list 1000 and check tables CT1 to CT5 may be updated by reprogramming via the setting I/F unit 418 or OTA (Over-The-Air) reprogramming.

If there is no check table to be used for value checking (NO in step S912), the received data is sent to the relay unit 406 and is transmitted from the second communication unit 408 to the Ethernet communication line 118 (step S918).

If there is a check table to be used for value checking (YES in step S912), determination of an anomalous value combination is made by using the identified check table (step S914).

For example, the check table CT2 is used for a combination of commands having control command IDs of 0x01 and 0x03. In this case, the determination unit 402 determines whether either one of the following anomaly conditions is satisfied: "the steering angle indicated by the control command data having a control command ID of 0x01 is greater than 40, and the brake command indicated by the control command data having a control command ID of 0x03 is greater than 200" and "the control command data having a control command ID of 0x01 is less than −40, and the brake command indicated by the control command data having a control command ID of 0x03 is greater than 200". If any one of the anomaly conditions indicated in the identified check table is satisfied (YES in step S916), it is determined that the control data included in the frame is anomalous and, thus, the processing performed by the relay ECU 116 proceeds to the after-anomaly detection process (step S920).

However, if none of the anomaly conditions indicated in the identified check table is satisfied (NO in step S916), it is determined that the control data included in the frame is not anomalous. The control data determined to be not anomalous is sent to the relay unit 406 and is transmitted from the second communication unit 1108 to the Ethernet communication line 118 (step S918).

As described above, the procedure for determination as to the presence/absence of an anomaly of the control frame made by the relay ECU 116 according to the present embodiment is performed and completed. The determination process is made for each of the frames received by the relay ECU 116.

Upon receiving, via the second Ethernet communication line 118, the control frame output by the relay ECU 116 that has determined that the control frame is not anomalous, the first relay conversion ECU 122 sequentially retrieves the control commands from the control frame. According to the present embodiment, the subsequent processes performed on the control frame are the same as those according to the first embodiment.

According to the above-described configuration of the present embodiment, the same effects as those of the first embodiment can be obtained.

Furthermore, according to the configuration of the present embodiment, the relay ECU 916 determines whether the control command included in a control frame to be relayed satisfies a condition predetermined according to the combination of types of control commands and, thus, detects whether the control frame is anomalous. In this manner, the occurrence of anomalous control of the vehicle 100 caused by execution of anomalous control data can be reliably prevented.

<Modification>

Figure 12:
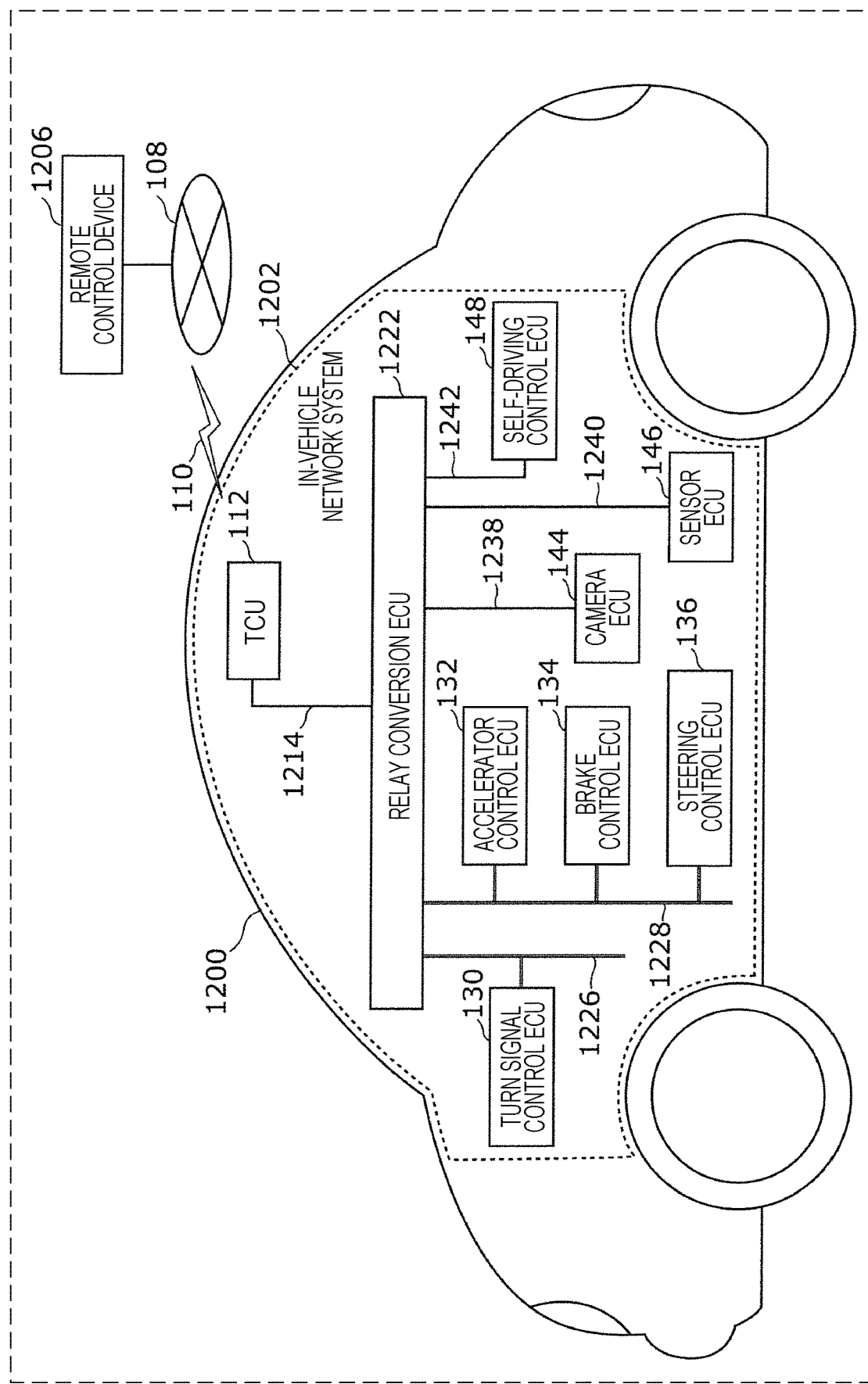
FIG. 12 is a diagram illustrating an example of the configuration of an in-vehicle network system and a vehicle external network including a remote control device according to a modification of the embodiment.

FIG. 12 is a diagram illustrating an example of the configuration of an in-vehicle network system according to a modification of the first or second embodiment. In FIG. 12, the same reference numerals are used for the same constituent elements as those in FIG. 1, and description of the constituent elements is not repeated.

Unlike the in-vehicle network system 102 according to the first or second embodiment, an in-vehicle network system 1202 mounted in a vehicle 1200 of the present modification does not include a relay ECU. In addition, the in-vehicle network system 1202 includes a relay conversion ECU having a plurality of CAN bus interfaces and Ethernet interfaces. A plurality of control networks including an Ethernet network and a CAN network are connected to the relay conversion ECU. The relay conversion ECU is responsible for determination of an anomaly of the received data, necessary conversion according to the destination of the control data, and transmission of the control data.

Note that in the following description, it is assumed that the vehicle 1200 has a self-driving capability and is based on a technology regarding state monitoring and remote control via a communication network, which can be put to practical use in the near future.

As illustrated in FIG. 12, a first CAN communication line 1226 and a second CAN communication line 1228 constituting a CAN network are connected to a relay conversion ECU 1222. The first CAN communication line 1226 and the second CAN communication line 1228 correspond to the first CAN communication line 126 and the second CAN communication line 128 according to the first and second embodiments, respectively. A variety of control ECUs are connected to each of the Ethernet and CAN systems.

In addition, a first Ethernet communication line 1214, a fourth Ethernet communication line 1238, a fifth Ethernet communication line 1240, and a sixth Ethernet communication line 1242 are connected to the relay conversion ECU 1222. The first Ethernet communication line 1214, the fourth Ethernet communication line 1238, the fifth Ethernet communication line 1240, and the sixth Ethernet communication line 1242 correspond to the first Ethernet communication line 114, the fourth Ethernet communication line 138, the fifth Ethernet communication line 140, and the sixth Ethernet communication line 142 according to the first and second embodiments, respectively. A variety of ECUs and a TCU are connected to these communication lines. The in-vehicle network system 1202 is connected to the vehicle external communication network 108 via radio communication 110 performed by the TCU 112. Furthermore, the TCU 112 is connected to each of the control networks via the relay conversion ECU 1222. The configuration of the relay conversion ECU 1222 is described below.

The in-vehicle network system 1202 is connected to the monitoring server 104 and a remote control device 1206 via the vehicle external communication network 108. According to the present modification, the monitoring server 104 used in the first and second embodiments is not provided. Upon receiving a remote control request from the vehicle 1200 via the vehicle external communication network 108, the remote control device 1206 transmits remote control data to the vehicle 1200. The remote control device 1206 is implemented by, for example, executing a predetermined program in one or more information processing apparatuses each including a processor, a memory unit, an input/output device, and a communication device.

Figure 13:
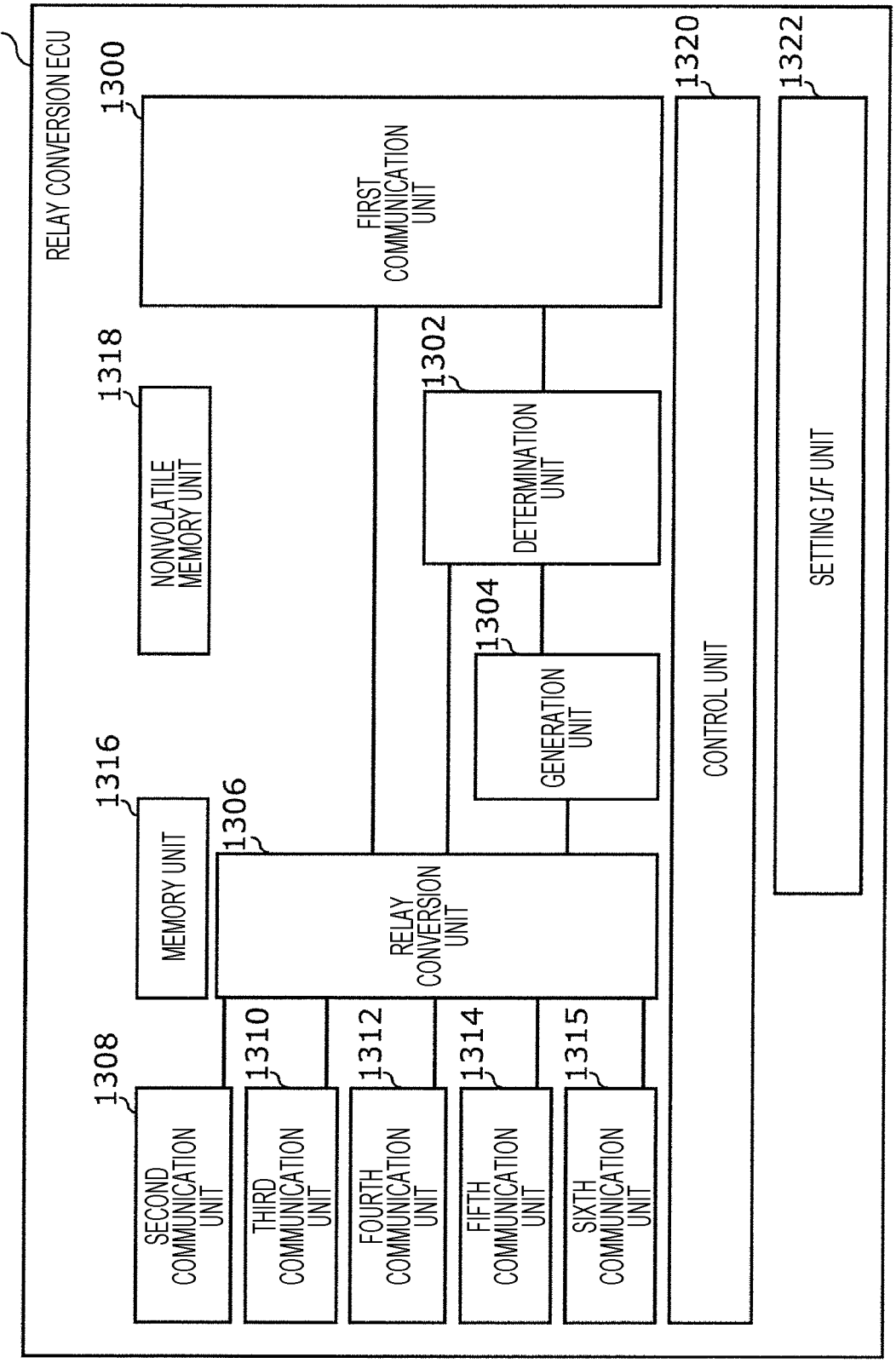
FIG. 13 is a diagram illustrating an example of the configuration of a relay conversion ECU according to the modification of the embodiment.

FIG. 13 is a block diagram illustrating an example of the configuration of the relay conversion ECU 1222.

The relay ECU 116 includes a first communication unit 1300, a second communication unit 1308, a third communication unit 1310, a fourth communication unit 1312, a fifth communication unit 1314, a sixth communication unit 1315, a memory unit 1316, a nonvolatile memory unit 1318, a determination unit 1302, a generation unit 1304, a relay conversion unit 1306, a control unit 1320, and a setting I/F unit 1322.

The first communication unit 1300 is connected to the first Ethernet communication line 114 and exchanges data with the TCU 112 via Ethernet. The second communication unit 1308 is connected to the fourth Ethernet communication line 1238 and exchanges data with the camera ECU 144 via Ethernet. The third communication unit 1310 is connected to the fifth Ethernet communication line 1240 and exchanges data with the sensor ECU 146 via Ethernet. The fourth communication unit 1312 is connected to the sixth Ethernet communication line 1242 and exchanges data with the self-driving control ECU 148 via Ethernet. The fifth communication unit 1314 is connected to the first CAN communication line 1226 and exchanges data with the turn signal control ECU 130 via CAN. The sixth communication unit 1315 is connected to the second CAN communication line 1228 and exchanges data with the accelerator control ECU 132, the brake control ECU 134, and the steering control ECU 136 via CAN.

The determination unit 1302, the generation unit 1304, the relay conversion unit 1306, and the control unit 1320 are functional constituent elements achieved by the processor included in the relay ECU 1222 that executes a predetermined program. The program is stored in the nonvolatile memory unit 1318 at the time of manufacturing the vehicle 1200 and is executed by using the memory unit 1316.

Figure 14:
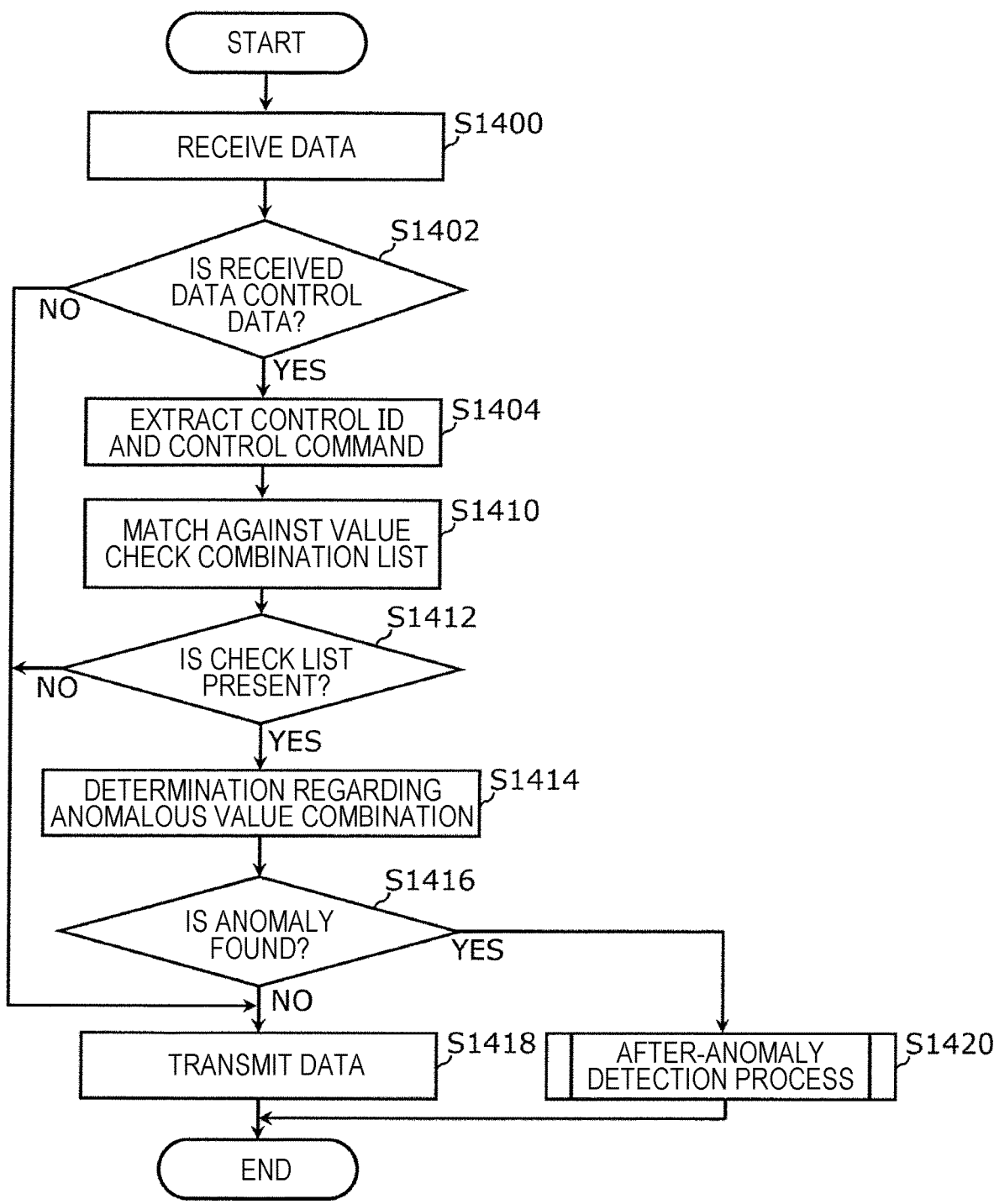
FIG. 14 is a flowchart illustrating an example of the procedure for the operation performed by the relay conversion ECU according to the modification of the embodiment.

Execution of self-driving control and remote control in the vehicle 1200 and switching between the control modes are basically the same as those according to the first and second embodiments. The process performed by the relay conversion ECU 1222, which makes the present modification differ from the first and second embodiments, is described below with reference to an example. The relay conversion ECU 1222 performs the process by executing the above-described predetermined program. The process includes determination as to the presence/absence of an anomaly of control data for the self-driving control operation or remote control operation. The flowchart illustrated in FIG. 14 describes an example of the procedure for the operation, which includes determination as to the presence/absence of an anomaly of the control data, performed by the relay conversion ECU 1222 that executes the program. In the following description, differences from the first and second embodiments are mainly described, and description of the processing procedure the same as that of the first embodiment is briefly described as needed.

It is determined by the determination unit 1302 whether the data received by the first communication unit 1300 (step S1400) is a control frame of the vehicle 1200 first (step S1402).

If as a result of this determination, the data is not a control frame (NO in step S1402), the frame is sent to the relay conversion unit 1306. In the relay conversion unit 1306, the frame is transmitted to one or more control networks via one or more of the communication units 1308 to 1315 corresponding to the destination of the frame (step S1418). Note that if the destination of the frame is a CAN network, the relay conversion unit 1306 performs Ethernet-CAN conversion on the frame and, thereafter, transmits the frame.

If the received data is a control frame (YES in step S1402), the determination unit 1302 extracts the control ID and the control command from the control frame (step S1404). In a description below, steps S1410, S1412, S1414 and S1416 correspond to steps S910, S912, S914 and S916 of the second embodiment, respectively. However, like the case of NO in step S1402, in the case of NO in step S1412 and in the case of NO in step S1416, the control command included in the control frame having a destination of a CAN network is subjected to Ethernet-CAN conversion in the relay conversion unit 1306. Thereafter, the control command is transmitted.

Note that according to the present modification, a step corresponding to determination regarding the remote control mode (step S503) made in the first embodiment may be executed subsequently to step S1402. In addition, a step corresponding to the matching process against the control command combination list (step S506) according to the first embodiment may be executed subsequent to step S1402. However, according to the present modification, for simplicity, description and figures of the steps are not given. Determination regarding the remote control mode may be made subsequent to step S1402. Furthermore, the matching process against the control command combination list may be performed subsequent to step S1404.

Figure 15:
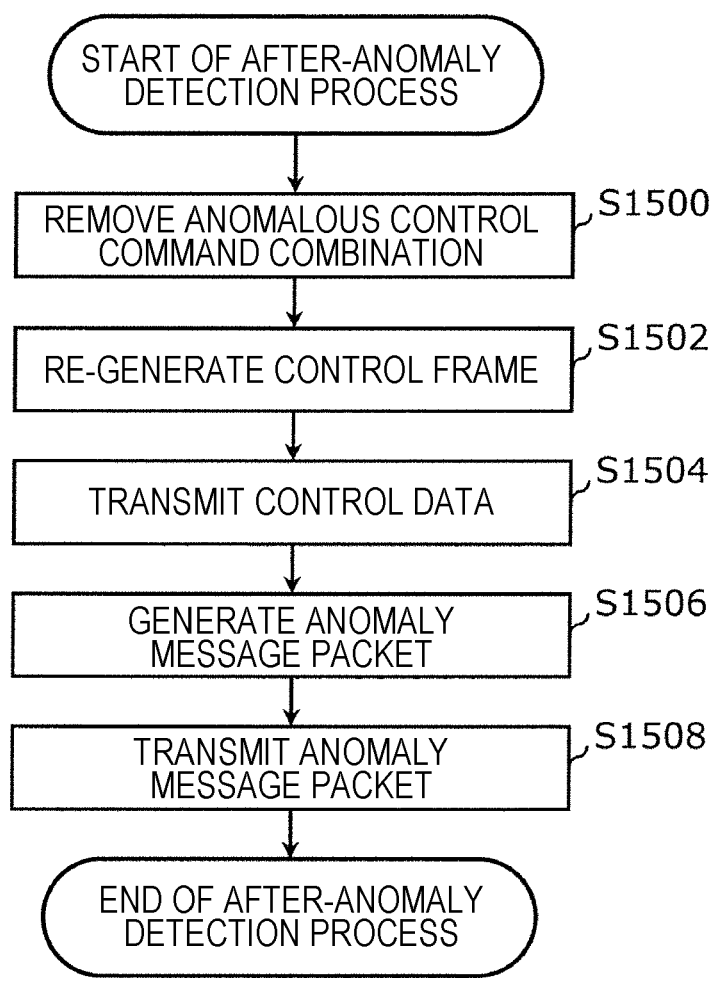
FIG. 15 is a flowchart illustrating an example of the procedure for the after-anomaly detection process performed by the relay conversion ECU according to the modification of the embodiment.

However, if the determination is YES in step S1416, the determination unit 1302 determines that an anomaly is found in the control frame, and the processing performed by the relay conversion ECU 1222 proceeds to the after-anomaly detection process (step S1420). The flowchart illustrated in FIG. 15 describes an example of the procedure for the after-anomaly detection process according to the present modification.

If the determination unit 1302 determines that an anomaly is found in the control frame, the generation unit 1304 removes, from the received control frame, a combination of control commands determined to be anomalous in value check (step S1500) and re-generates a control frame (step S1502).

The control frame without having the removed control command including the anomalous value is sent to the relay conversion unit 1306. In the relay conversion unit 1306, the control frame is transmitted to one or more of the control networks via one or more of the communication units 1308 to 1315 corresponding to the destination of the frame (step S1504). However, if the destination of the control frame is a CAN network, the relay conversion unit 1306 performs Ethernet-CAN conversion on the frame and transmits the frame. This conversion includes conversion of the control command ID into the CAN ID using the control command ID conversion table 800.

In addition, the generation unit 1304 generates an anomaly message packet for notifying that an anomaly has been detected (step S1506). The anomaly message packet is transmitted to the relay conversion unit 1306 and the first communication unit 1300 and is transmitted from the second to sixth communication units 1308 to 1315 to the control network of the vehicle 1200. In addition, the anomaly message packet is transmitted from the first communication unit 1300 to the remote control device 106 outside the vehicle (step S1508).

According to the above-described configuration of the present modification, the same effects as those of the first and second embodiments can be obtained.

Other Modifications

As described above, the first and second embodiments and the modifications thereof have been described as examples of a technique according to the present disclosure. However, the technique according to the present disclosure is not limited thereto. The technique is applicable to the embodiments for which a change, substitution, addition, and deletion are made as appropriate. For example, the following modifications are also encompassed within an aspect of the present disclosure.

Figure 16:
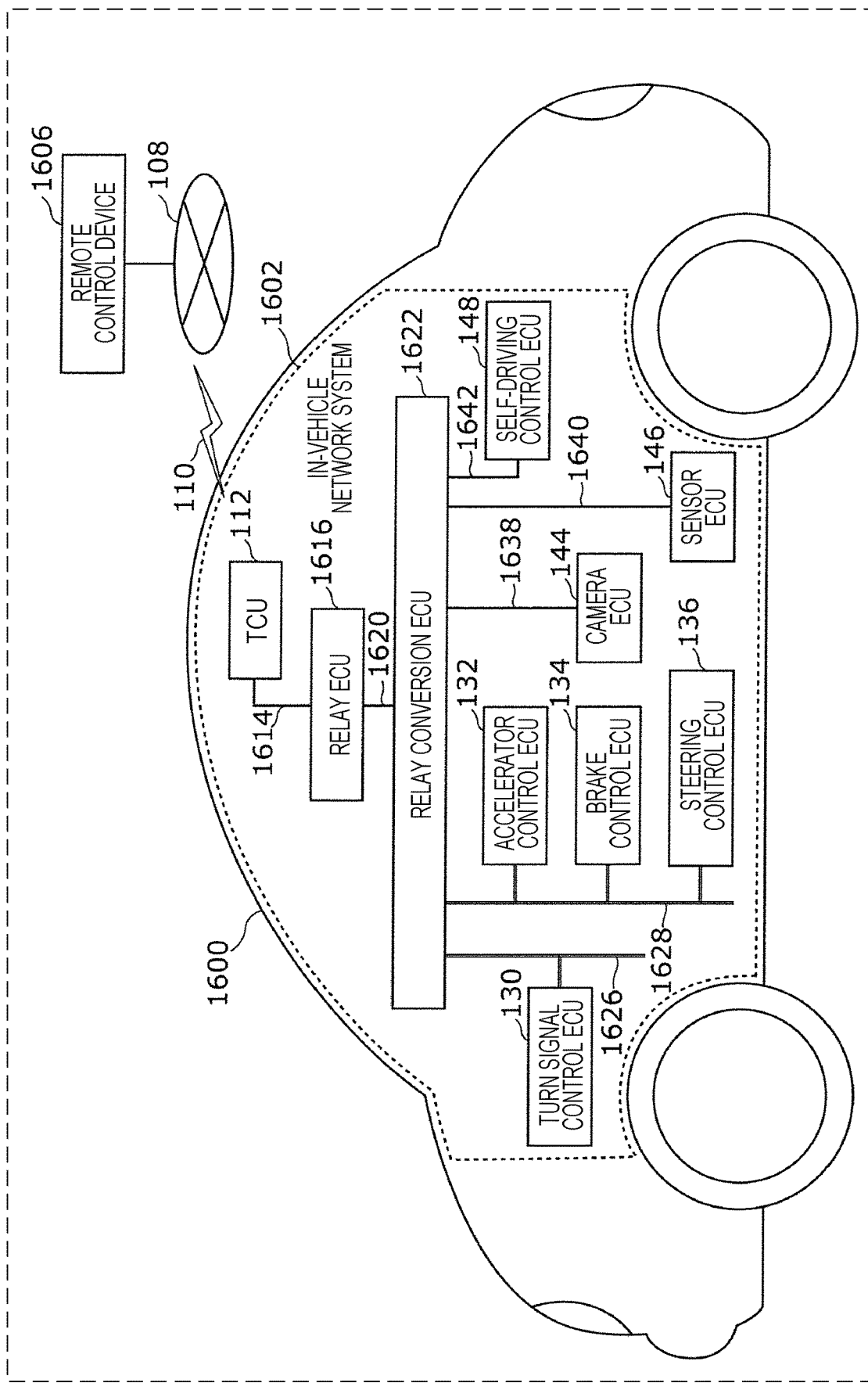
FIG. 16 is a diagram illustrating an example of the configuration of an in-vehicle network system and a vehicle external communication network including a remote control device according to another modification.

The configuration of the in-vehicle network system is not limited to those illustrated in FIG. 1 or FIG. 12. For example, the technique according to the present disclosure is applicable to an intermediate configuration of the configuration illustrated in FIG. 1 or 12. FIG. 16 is a diagram illustrating an example of such a configuration of an in-vehicle network system.

A vehicle 1600 according to the modification includes an in-vehicle network system 1602. As compared with the in-vehicle network system 102, the in-vehicle network system 1602 has a relay ECU that relays data between the relay conversion ECU and the TCU, like the in-vehicle network system 102. However, the relay conversion ECUs differ from each other. Unlike the in-vehicle network system 1202, the in-vehicle network system 1602 includes a relay ECU. However, like the in-vehicle network system 1202, the in-vehicle network system 1602 has only one relay conversion ECU to which all of the control networks (the CAN networks and the Ethernet networks) are connected.

Figure 17:
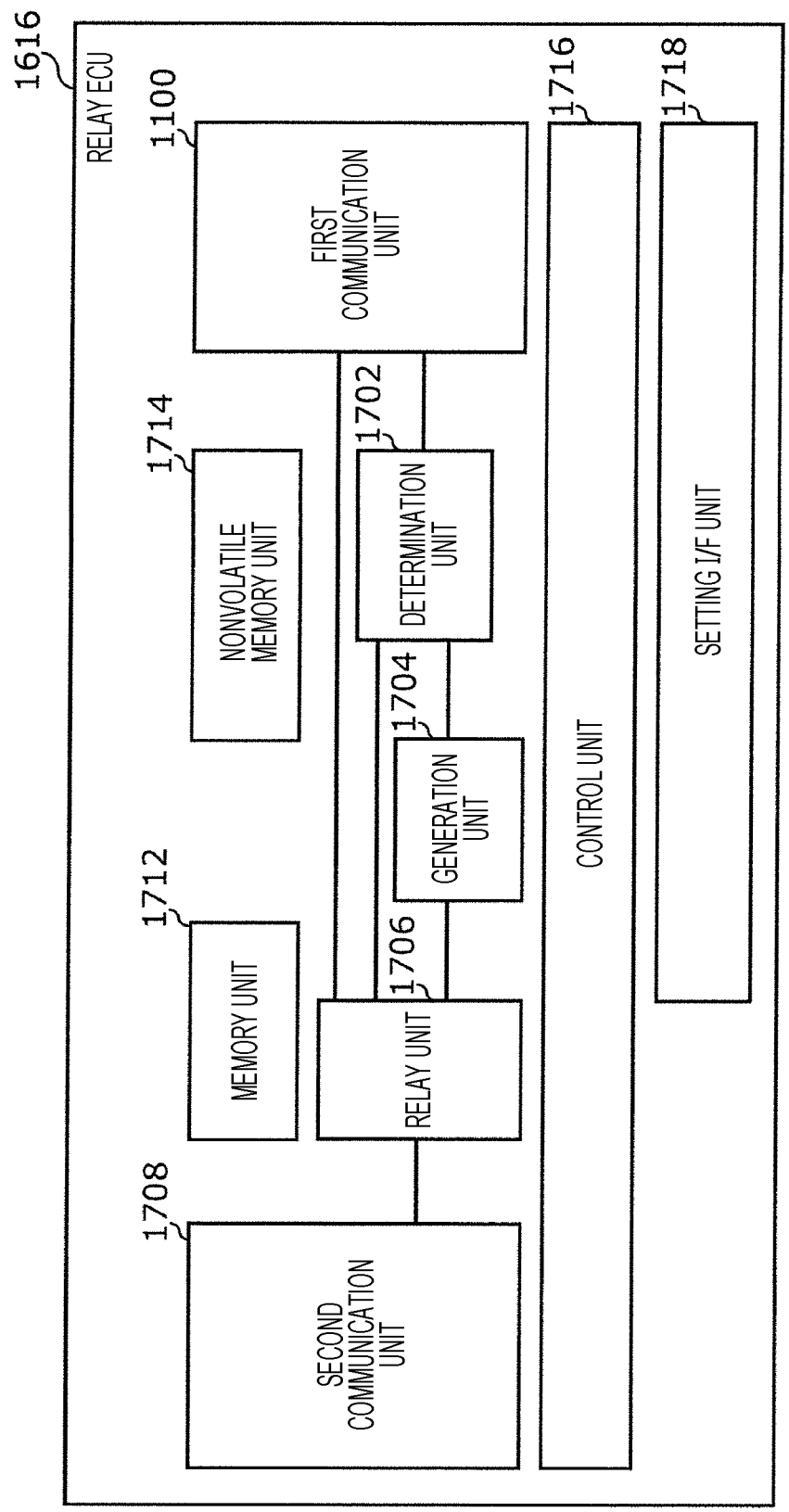
FIG. 17 is a diagram illustrating an example of the configuration of a relay ECU according to the another modification.

In the in-vehicle network system 1602 having such a configuration, a determination of an anomaly of the control data may be made by either a relay ECU 1616 or a relay conversion ECU 1622. If the determination is made by the relay ECU 1616, the relay ECU 1616 has a configuration indicated by the block diagram illustrated of FIG. 17.

The configuration is also an example of the configuration of the in-vehicle network system. The configuration may include, for example, an ECU that further provides functions other than those described above. In addition, the configuration may include an increased number of CAN networks or Ethernet networks. Furthermore, different system control ECUs may be connected to one CAN network. Still furthermore, according to the above-described embodiments and modifications, the plurality of functions are provided by the plurality of ECUs. However, the plurality of functions may be provided by a single ECU.

In addition, while the above embodiments and modifications have been described with reference to the processing procedure for a determination of an anomaly made on the data received by the first communication unit by using the relay ECU or the relay conversion ECU, the same process is applicable to Ethernet data received by another communication unit.

In addition, while the above second embodiment and modification have been described with reference to the procedure for value checking using a condition including a combination of two types of control commands, a condition including a combination of three or more types of control commands may be used. The load imposed on the determination process and the load imposed on the list management increase with increasing number of types of combined control commands. However, the determination of an anomaly can be made more finely and accurately.

In addition, a plurality of types of control command combination list, value check combination list, or check table described in each of the embodiments and modifications may be provided. Thus, the plurality of types of each list or the like may be switched and referenced in accordance with the state of the vehicle. The relay ECU or the relay conversion ECU may acquire the state of the vehicle on the basis of, for example, state data indicating the state of the vehicle and transmitted from each of the control ECUs. Alternatively, the relay ECU or the relay conversion ECU may acquire the state of the vehicle from the monitoring server outside the vehicle. Examples of the state of the vehicle include, but not limited to, the type that indicates what controls driving (e.g., manual driving, self-driving, or driving by remote control), an ON/OFF operation of a particular temporary function (e.g., an autoparking function), information as to whether a breakdown of a particular part occurs, a driving location, weather, a travel speed, a shift position, a fuel level or a battery level, and information as to whether an obstacle is detected.

While the above embodiments and modifications have been described with reference to the vehicle 100 and the remote control device 106 communicating with each other via the TCU, another path, such as Wi-Fi, may be used. In addition, the functions of the TCU may be included in another ECU not mentioned above, such as an ECU that provides the IVI (In-Vehicle Infotainment) function.

While the above embodiments and modifications have been described with reference to a TLS session established between the remote control device and the TCU, a TLS session may be established between the remote control device 106 and one of the relay ECU 116 and the relay conversion ECU 1222.

Furthermore, according to the above-described embodiments and modifications, a control frame format to be processed is not limited to the control frame format 200 illustrated in FIG. 2. For example, a control frame format 1800A illustrated in FIG. 18A may be employed in a vehicle for which remote control is not performed.

In addition, a determination of an anomaly can be made for even the control frame format 1800B not having a control ID indicating the type of control as illustrated in FIG. 18B. In this case, if a combination of types of control commands each indicated by the control command ID of a control command is not a preset certain combination, it may be determined that an anomaly occurs regardless of the type of control indicated by the control ID. As a result, a broader range and more exhaustive combination of control frames can be subjected to a determination of anomaly, and anomaly detection can be performed for various details of control operations indicated by combinations of control frames. It should be noted that even when anomaly detection is performed on a control frame having a format including a control ID, anomaly detection may be performed on the basis of a combination of control commands each indicated by a control command ID without using the control ID.

In addition, a control frame format 1500 illustrated in FIG. 18C may be employed. In the control frame format 1500, a CAN ID and a CAN payload (a data field) are used as a control command ID and control command data, respectively.

While the above embodiments and modifications have been described with reference to the control operations performed by the self-driving control ECU and the remote control device that use control frames having the same format except for the remote control flag, control frames having different formats can be used.

In addition, according to the above-described embodiments and modifications, various data are written into the nonvolatile memory unit via the setting I/F unit. However, the various data may be written via any one of the communication units, instead of the setting I/F unit.

In addition, while the above embodiments and modifications have been described with reference to data conversion performed between different standards (i.e., Ethernet and CAN), the range of application of the technology according to the present disclosure is not limited thereto. For example, the technology according to the present disclosure is applicable to a network systems that comply with various standards, such as CAN-FD, Ethernet (registered trademark), MOST, LIN (Local Interconnect Network), and Flexray (registered trademark). Furthermore, in a situation in which the size of a payload included in control data needs to be changed at a relay point, conversion based on the same standard can be applied.

In addition, while the above embodiments and modifications have been described with reference to a determination of an anomaly of the control data made by the in-vehicle communication relay device, the determination of an anomaly of the control data may be made by a monitoring device that is located on an Ethernet network and that is not involved in the relay function, for example.

In addition, while the above embodiments and modifications have been described under the condition that they are applied to an in-vehicle network system, the application range of the present disclosure is not limited thereto. For example, the present disclosure is applicable to the field of mobility, such as a construction machine, an agricultural machine, a ship, a railway, or an airplane. Furthermore, the present disclosure is effectively applicable to the industrial field and the field of factory control, such as a smart factory.

According to the present disclosure, the in-vehicle relay device or the like has a function of detecting an anomaly of control data used for driving assistance or self-driving control of an automobile. The in-vehicle relay device is useful for in-vehicle network systems of an automobile and a self-driving vehicle. The in-vehicle relay device is also applicable to remote control of manufacturing systems in factories.

What is claimed is:

1. An in-vehicle relay device for relaying communication between a plurality of control devices in a vehicle over a plurality of networks to which the plurality of control devices are connected, the in-vehicle relay device comprising:
a communication circuit that receives control data from a first control network included in the plurality of networks, the control data including, in a frame, a plurality of control commands to be executed by at least one of the control devices; and
a processor that
determines, as a first determination, whether control command types of the plurality of control commands included in the frame form a first combination, the first combination being preset as a combination of control commands that are consistent with one another to be executable simultaneously,
determines, as a second determination, whether the control data is anomalous by using a result of the first determination, and
outputs a result of the second determination.

2. The in-vehicle relay device according to claim 1, wherein, when the processor determines that the combination of the types of control commands is not the first combination in the first determination, the processor determines that the control data is anomalous in the second determination.

3. The in-vehicle relay device according to claim 2, wherein the control data further includes a control ID indicating a type of control, and
wherein the first combination is set for the type of control indicated by the control ID.

4. The in-vehicle relay device according to claim 2, wherein the processor further acquires state data indicating a state of the vehicle, and the first determination is made by using the first combination that varies in accordance with the state indicated by the state data.

5. The in-vehicle relay device according to claim 4, wherein the state data is data based on data transmitted by at least one of the control devices.

6. The in-vehicle relay device according to claim 1, wherein the processor further
determines, as a third determination, whether a combination of information in the control commands is a second combination that is preset for the first combination, and
outputs a result of the third determination when the processor determines that the combination of the types of control commands is the first combination in the first determination, and
wherein, when the processor determines that the combination of information in the control commands is not the second combination in the third determination, the processor determines that the control data is anomalous.

7. The in-vehicle relay device according to claim 6, wherein the second combination is a combination of predetermined value ranges within each of which an operational amount included in one of the control commands is to be included.

8. The in-vehicle relay device according to claim 7, wherein the processor further acquires state data indicating a state of the vehicle, and
wherein the predetermined value ranges vary in accordance with the state indicated by the state data.

9. The in-vehicle relay device according to claim 1, further comprising:
a relay circuit,
wherein, when the processor determines that the control data is not anomalous, the relay circuit transmits the plurality of control commands to a second control network of the plurality of control networks,
wherein the second control network differs from the first control network, and
wherein the second control network is a predetermined destination corresponding to each of the control commands.

10. The in-vehicle relay device according to claim 9, wherein the control data further includes control command IDs each indicating a type of one of the plurality of control commands, and
wherein the relay circuit
converts a control command ID that is attached to a control command to be transmitted and that indicates a type of the control command into a control command ID in accordance with a predetermined conversion rule, and
transmits the control data to the second control network.

11. The in-vehicle relay device according to claim 10, wherein the relay circuit converts each of the plurality of control commands in accordance with a predetermined conversion rule and transmits converted control commands.

12. The in-vehicle relay device according to claim 11, wherein largest data size of a control command transmittable in the one frame in the first control network is larger than largest data size of a control command transmittable in one frame in the second control network, and
wherein the relay circuit separates the plurality of control commands included in the frame of the control data received from the first control network into a plurality of frames and transmits separated frames to the second control network.

13. The in-vehicle relay device according to claim 12, wherein the first control network and the second control network comply with different standards.

14. The in-vehicle relay device according to claim 13, wherein, among the different standards, a standard with which the first control network complies is Ethernet (registered trademark), and a standard with which the second control network complies is CAN (Controller Area Network).

15. An in-vehicle monitoring device that is included in an in-vehicle network having a first control network and a second control network between which communication is relayed by a relay device and that is connected to the first control network, the in-vehicle monitoring device comprising:
a communication circuit that receives control data transmitted from a control device connected to the first control network, the control data including, in a frame, a plurality of control commands for control to be performed by a control device connected to the second control network; and
a processor that
determines, as a first determination, whether control command types of the plurality of control commands included in the frame form a first combination, the first combination being preset as a combination of control commands that are consistent with one another to be executable simultaneously,
determines, as a second determination, whether the control data is anomalous by using a result of the first determination, and
outputs a result of the second determination,
wherein largest data size of a control command transmittable in one frame in the first control network is larger than largest data size of a control command transmittable in one frame in the second control network.

16. A communication monitoring method for use of an in-vehicle relay device that relays communication between a plurality of control devices in a vehicle over a plurality of networks to which the plurality of control devices are connected, the in-vehicle relay device including a communication circuit and a processor, the method comprising:
receiving, by the communication circuit, control data from a first control network included in the plurality of networks, the control data including, in a frame, a plurality of control commands to be executed by at least one of the control devices;
determining, by the processor, a first determination as to whether control command types of the plurality of control commands included in the frame form a first combination, the first combination being preset as a combination of control commands that are consistent with one another to be executable simultaneously;
determining, by the processor, a second determination as to whether the control data is anomalous by using a result of the first determination; and
outputting, by the processor, a result of the second determination.

17. A non-transitory computer-readable recording medium storing a program for use in an in-vehicle relay device that relays communication between a plurality of control devices in a vehicle over a plurality of networks to which the plurality of control devices are connected, the in-vehicle relay device including a communication circuit and a processor, the program comprising a program code executing a method, when the program is executed by the processor, the method comprising:
receiving, by the communication circuit, control data from a first control network included in the plurality of networks, the control data including, in a frame, a plurality of control commands to be executed by at least one of the control devices;
determining, as a first determination, whether control command types of the plurality of control commands included in the frame form a first combination, the first combination being preset as a combination of control commands that are consistent with one another to be executable simultaneously;
determining, as a second determination, whether the control data is anomalous by using a result of the first determination; and
outputting a result of the second determination.

18. An in-vehicle network system comprising:
a first control network and a second control network having a plurality of control devices connected thereto, that facilitate communication between the control devices being relayed by an in-vehicle relay device,
wherein largest data size of a control command transmittable in one frame in the first control network is larger than largest data size of a control command transmittable in one frame in the second control network, wherein the control data transmitted from the first control network to the second control network includes, in one frame, a combination of a plurality of control commands that cause control devices connected to the second control network to perform predetermined control operations simultaneously, and wherein control types of the plurality of control commands included in the combination are consistent with one another to be executable simultaneously.

19. The in-vehicle network system according to claim 18, wherein each of the control commands indicates one of details of a steering control operation, details of an acceleration control operation, details of a deceleration control, and details of a turn signal control operation.

20. The in-vehicle network system according to claim 19, wherein the control data further includes a control ID indicating a type of control corresponding to a combination of the control commands.

* * * * *